(12) United States Patent
Dorfman et al.

(10) Patent No.: US 10,924,932 B2
(45) Date of Patent: *Feb. 16, 2021

(54) VIRTUAL PRIVATE NETWORK BASED PARENTAL CONTROL SERVICE WITH MOTION-BASED RESTRICTED MODE

(71) Applicant: Oath Inc., New York, NY (US)

(72) Inventors: Scott Dorfman, Reston, VA (US); Umesh S. Chhatre, Ashburn, VA (US)

(73) Assignee: Verizon Media Inc., New York, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/386,018

(22) Filed: Apr. 16, 2019

(65) Prior Publication Data
US 2019/0246278 A1  Aug. 8, 2019

Related U.S. Application Data

(63) Continuation of application No. 15/159,584, filed on May 19, 2016, now Pat. No. 10,264,458, which is a
(Continued)

(51) Int. Cl.
*H04W 12/08* (2009.01)
*H04M 15/00* (2006.01)
(Continued)

(52) U.S. Cl.
CPC ......... *H04W 12/08* (2013.01); *H04L 63/0272* (2013.01); *H04M 1/67* (2013.01);
(Continued)

(58) Field of Classification Search
CPC . H04W 12/08; H04W 4/027; H04W 12/0027; H04L 63/0272; H04M 1/67;
(Continued)

(56) References Cited

U.S. PATENT DOCUMENTS 8,806,570 B2 * 8/2014 Barton .................... H04L 63/20
726/1
9,560,053 B2 * 1/2017 Prisser .................. H04L 63/102
(Continued)

*Primary Examiner* — Michael S McNally
(74) *Attorney, Agent, or Firm* — Cooper Legal Group, LLC

(57) ABSTRACT

In various embodiments, methods and systems for implementing motion-based parental controls on mobile devices using virtual private network (VPN)-based parental control services are provided. A parental control profile is received at a controlled device where the parental control profile includes instructions to configure the controlled device with a device motion-based control policy. The device motion-based control policy includes a motion-related condition and a resource that is restricted when the motion-related condition is met. A VPN is configured using the parental control profile. The VPN comprises a virtual point-to-point connection between the controlled device and a network of the parental control service. When it is determined that the motion-related condition of the controlled device has been met, a restricted mode is initiated on the controlled device to restrict the resource. It is contemplated that the restricted mode supports a VPN channel and a cellular channel for restricted and unrestricted resources, respectively.

20 Claims, 16 Drawing Sheets

Related U.S. Application Data continuation-in-part of application No. 14/728,713, filed on Jun. 2, 2015, now Pat. No. 9,912,697.

(51) Int. Cl.
| | | |
|---|---|---|
| *H04M 1/67* | (2006.01) | |
| *H04L 29/06* | (2006.01) | |
| *H04W 4/02* | (2018.01) | |
| *H04W 12/00* | (2009.01) | |
| *H04M 1/725* | (2006.01) | |

(52) U.S. Cl.
CPC ......... *H04M 15/883* (2013.01); *H04W 4/027* (2013.01); *H04W 12/0027* (2019.01); *H04M 1/72566* (2013.01); *H04M 1/72569* (2013.01)

(58) Field of Classification Search
CPC . H04M 15/883; H04M 1/2566; H04M 1/2569

USPC .............................................................. 726/1

See application file for complete search history.

(56) References Cited

U.S. PATENT DOCUMENTS

| | | | |
|---|---|---|---|
| 2006/0075052 A1* | 4/2006 | Oostendorp | H04L 51/12 709/206 |
| 2008/0139193 A1* | 6/2008 | Hao | H04N 7/17318 455/420 |
| 2016/0014258 A1* | 1/2016 | Hwang | H04W 68/005 455/418 |
| 2016/0135006 A1* | 5/2016 | Fjeldsoe-Nielsen | H04W 4/023 455/456.3 |
| 2017/0329690 A1* | 11/2017 | Cudak | G06F 11/3452 |
| 2018/0332178 A1* | 11/2018 | Ni | H04W 4/021 |

\* cited by examiner

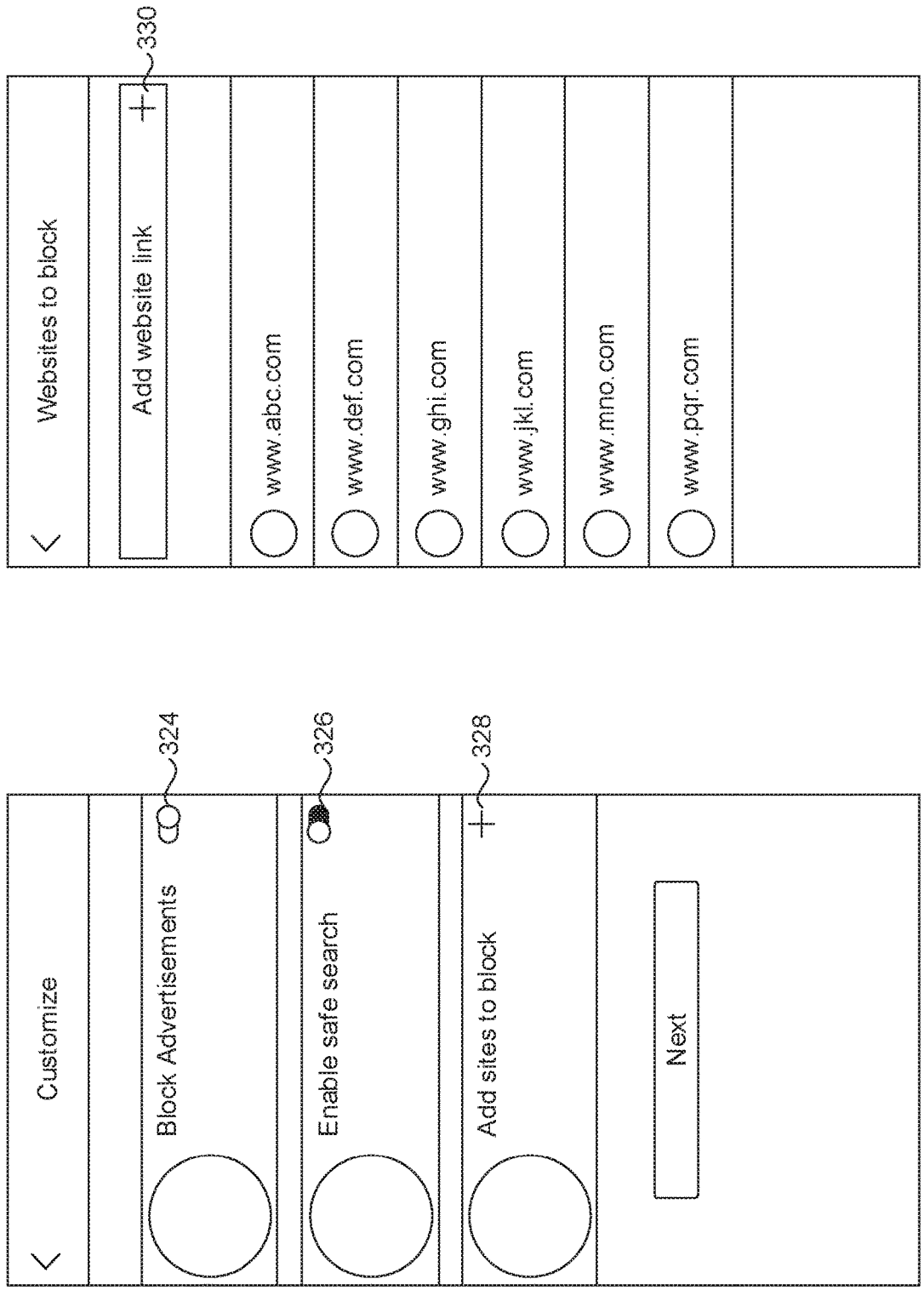

FIG. 3H

Step 3: Device time restrictions  332
334A

Time of day

All day
Starts    03:15 AM
Ends     05:15 PM
Repeat   Never

Done

FIG. 3I

Step 3: Device time restrictions  332
334B

Time of day

All day
Starts    03:15 AM
Ends     05:15 PM
Repeat   Never

Done

Step 3: Device time restrictions +  ~332

Time of day

All day  03:15 AM
Starts  03:15 AM
Ends  05:15 PM
Repeat  Never ⌄

Never
Everyday
Monday - Friday
Weekends

Done

Done!

Type in the following URL on the browser of your child's phone to setup the restriction.

www.abcdefg.com/kjhkhk ~338

Send link as text email link

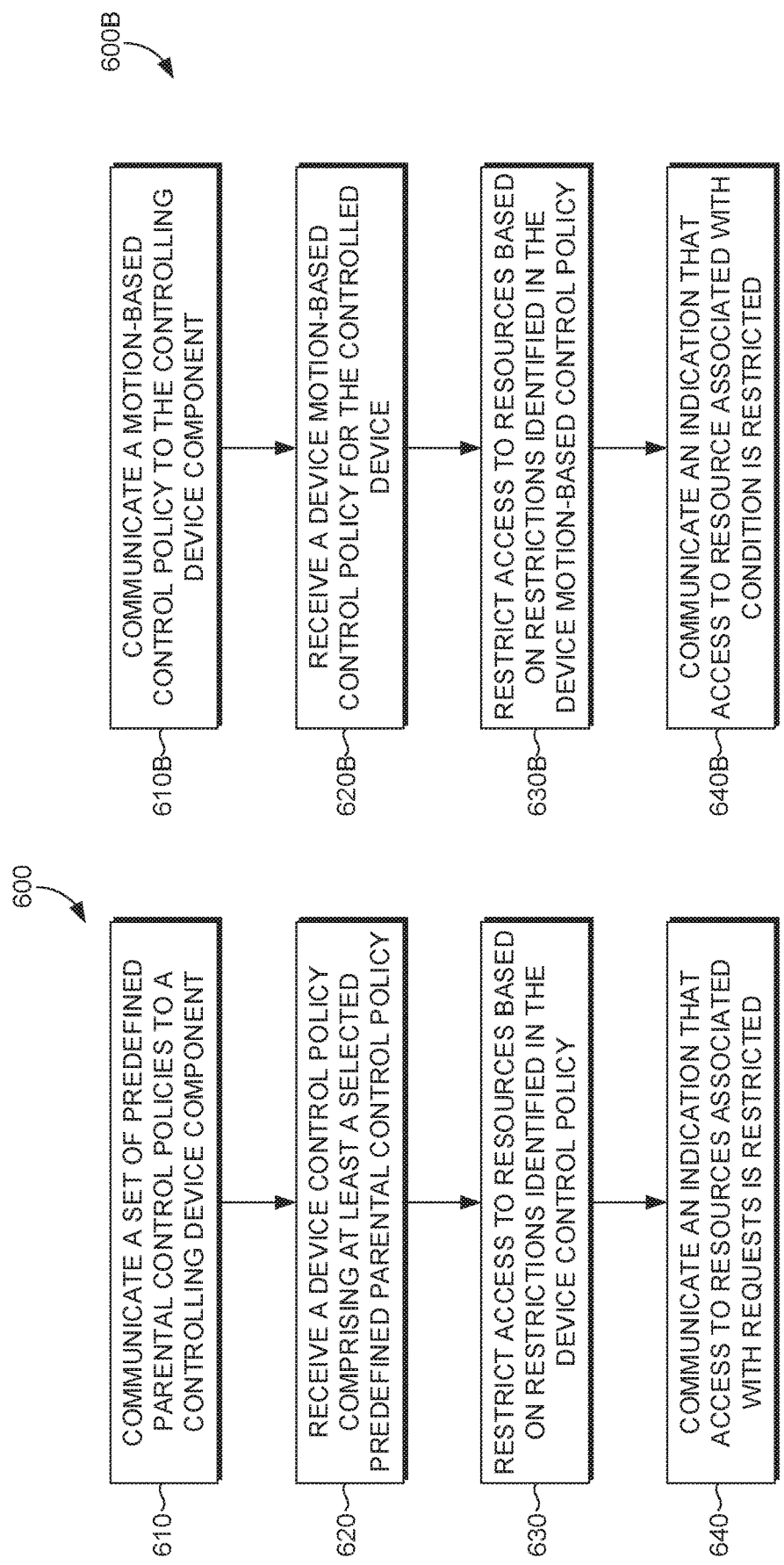

VIRTUAL PRIVATE NETWORK BASED PARENTAL CONTROL SERVICE WITH MOTION-BASED RESTRICTED MODE

CROSS-REFERENCE TO RELATED APPLICATIONS

This application is a continuation of, and claims priority to, U.S. patent application Ser. No. 15/159,584, filed May 19, 2016, entitled "VIRTUAL PRIVATE NETWORK BASED PARENTAL CONTROL SERVICE WITH MOTION-BASED RESTRICTED MODE," which is a continuation-in-part of, and claims priority to, U.S. patent application Ser. No. 14/728,713, filed Jun. 2, 2015, entitled "VIRTUAL PRIVATE NETWORK BASED PARENTAL CONTROL SERVICE." Both U.S. patent application Ser. No. 15/159,584 and U.S. patent application Ser. No. 14/728,713 are incorporated herein by reference in their entirety.

BACKGROUND

Parental controls generally refer to features that regulate access to content. Parental controls can be included in a variety of media platforms, from video games and television services to mobile devices and software. Parental controls can be defined for content that is configured, stored, and accessed differently. Implementing and managing parental controls for media platforms and content can present challenges with increased accessibility to media platforms and different types of content. Additionally, challenges in implementing parental controls can also be due to the different contexts (e.g., while in motion) and management software (e.g., messaging platform) of media platforms. Resolving such context and management software challenges can be part of a technology-based solution that also implicates the specific configuration and components that support the media platforms.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for implementing parental controls on mobile devices using virtual private network (VPN)-based parental control services. A set of predefined parental control policies is accessed at a controlling device that implements a parental control service interface for configuring parental control services for a controlled device. A predefined parental control policy comprises a plurality of restricted resources. The set of predefined parental control policies can be provided via the parental control service interface to a user using a VPN-based parental control service. A selected predefined parental control policy is received from the user. The selected predefined parental policy is associated with a parental control profile of the user. The parental control profile comprises instructions to configure a controlled device to be restricted based on a device control policy. The device control policy is generated at the controlling device. The device control policy comprises at least the predefined parental control policy. It is contemplated that custom restricted resources and additional controls (e.g., usage controls and application controls) can be configured for the device control policy. The device control policy is communicated to a parental control server. The parental control server can restrict access to resources based on restricted resources identified in the device control policy, where requests for resources are received at the parental control server using a VPN of the parental control service. It is contemplated that configuring the controlled device comprises the parental control server communicating the parental control profile to the controlled device such that the VPN is configured using the parental control profile. The VPN restricts and directs communications from the controlled device to the VPN for enforcement of the device control policy.

Embodiments of the present invention further provide methods and systems for implementing motion-based parental controls on mobile devices using virtual private network (VPN)-based parental control services. A motion-based parental control policy is accessed using a controlling device that implements a parental control service interface for configuring motion-based parental control services for a controlled device. The motion-based parental control policy comprises conditions and corresponding respective resources that are restricted when the conditions are met.

The motion-based parental control policy can be accessed, by a user, via the parental control service interface. The parental control service is a VPN-based parental control service. The motion-based parental control policy can be predefined, for example, a motion-based parental control policy can include pre-selected policy attributes and in the alternative the motion-based control policy can be user-defined with the user selecting policy attributes. The motion-based parental control policy is received from the user (e.g., controlling user or parent). The motion-based parental control policy is associated with a parental control profile of the user such that the user can associate the motion-based parental policy with a controlled device. In particular, the motion-based parental control policy is used to generate a device motion-based control policy for a device. The device motion-based control policy is associated with the device and comprises policy attributes such as conditions, custom restricted resources and additional controls (e.g., usage controls and application controls) that are used to control the device.

The parental control profile comprises instructions to configure a controlled device to be restricted using the device motion-based control policy. The device motion-based control policy is generated via the controlling device. The device motion-based control policy is communicated to a parental control server based in part on the parental control profile associated with the device. It is contemplated that configuring the controlled device comprises the parental control server communicating the parental control profile to the controlled device such that a VPN is configured using the parental control profile. The parental control profile may include the device motion-based control policy or a reference to the device motion-based control policy to further configure the VPN for motion-based restrictions. The parental control server can monitor the controlled device to implement the device motion-based policy. The parental control server may be supported based on a local application or service running on the controlled device. In particular, a determination whether a condition is met at the controlled device, and a request for a respective resource, of the condition, is restricted when the condition is met.

Using the VPN configured for the controlled device, the parental control server restricts access to resources based on the conditions and restricted resources identified in the device motion-based control policy. The VPN restricts and directs communications from the controlled device to the VPN for enforcement of the device motion-based control policy. The parental control server can communicate with controlled device to trigger a restricted mode on the controlled device. The restricted mode may operate with only a VPN channel or operate using a VPN channel and a cellular channel, where the cellular channel is used to process data traffic of resources that are not restricted. The VPN channel can specifically be implemented as a packet inspection channel based on a proxy service for intercepting, inspecting, queuing, and communicating messages addressed to the controlled device.

The restricted mode may further operate in part based on the proxy service available via the VPN channel. In particular, the restricted mode can include the proxy service that identifies messages from a messaging platform associated with the controlled device. The proxy service uses packet inspection to match a known data packet structure of packets from the messaging platform to packets that are received at the proxy service. The proxy service can therefore identify packets that are from the messaging platform. Identifying packets that are received from the messaging platform can help the proxy service circumvent a message-receipt verification retry logic of the messaging platform. The message-receipt verification retry logic is a configuration of the messaging platform of the controlled device that operates to confirm receipt of communications to controlled device. Circumventing the retry logic includes the proxy service generating a proxy message that meets an expected packet structure of a response acknowledging receipt of a message communicated to the controlled device. The proxy service communicates the proxy message through the VPN to the messaging platform to indicate that the communication to the controlled device has been received at the controlled device, when the message has only been actually received by the proxy service.

BRIEF DESCRIPTION OF THE DRAWINGS

The present invention is described in detail below with reference to the attached drawing figures, wherein:

FIGS. 3A-3M are schematics of an exemplary application configuration manager interface of a parental control service system, in accordance with embodiments described herein;

FIG. 6A is a flow diagram showing an exemplary method for implementing parental controls on mobile using virtual private network (VPN)-based parental control services, in accordance with embodiments described herein;

FIG. 6B is a flow diagram showing an exemplary method for implementing motion-based parental controls on devices using virtual private network (VPN)-based parental control services, in accordance with embodiments described herein.

DETAILED DESCRIPTION

Figure 1A:
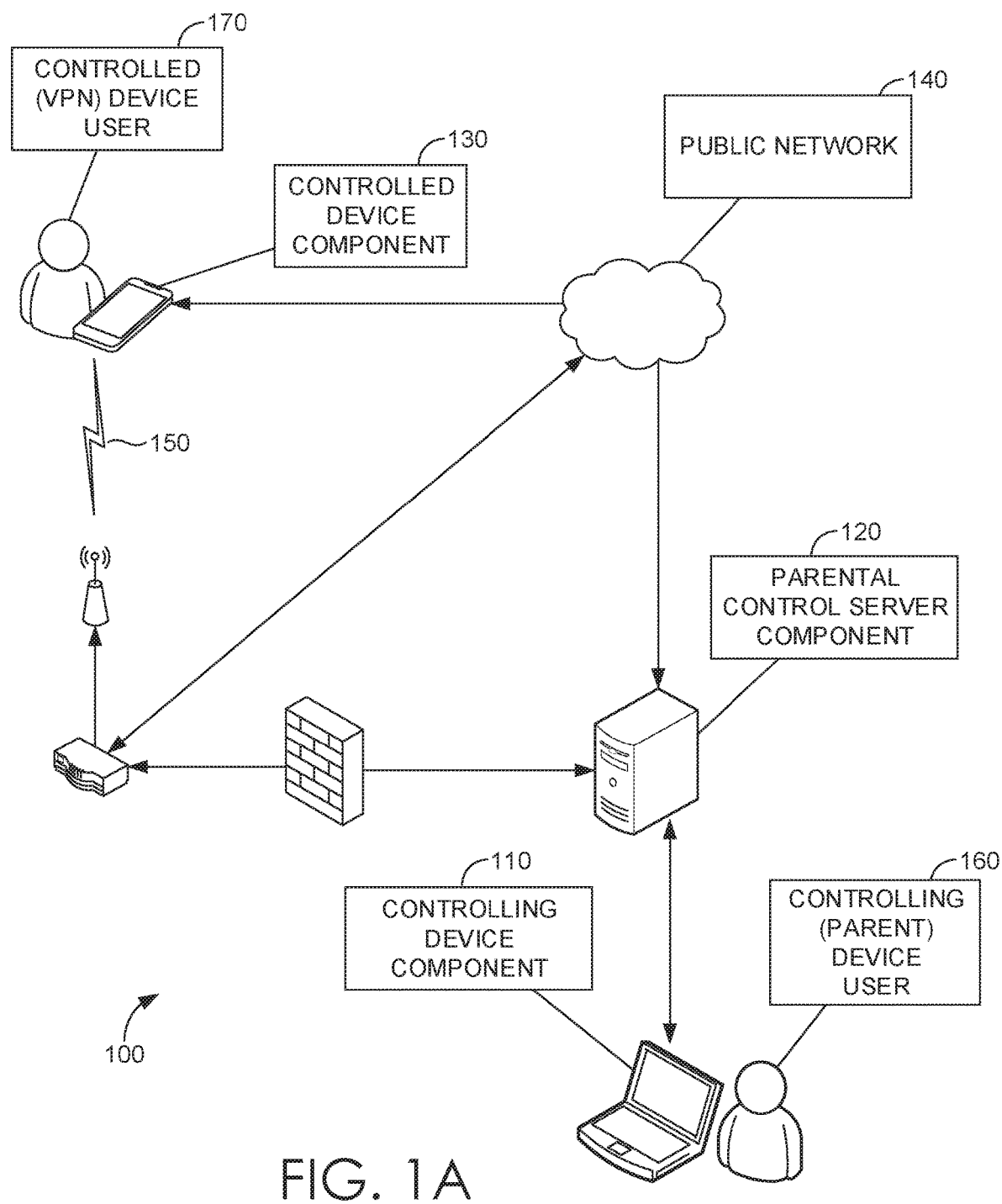
FIGS. 1A and 1B are block diagrams of an exemplary parental control service system in which embodiments described herein may be employed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to distributed computing devices, components, and a parental control service platform that supports implementing parental controls using a VPN-based parental control service. Components can be configured for performing novel aspects of embodiments, wherein configured for comprises the components being programmed to perform particular tasks or implement particular abstract data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Parental controls include features (e.g., content controls, application controls, and usage controls) that regulate or restrict access to content of different devices (e.g., mobile devices). Implementing and managing parental controls for mobile devices can present challenges with increased accessibility to mobile devices and content that is stored and accessed differently. In particular, mobile device parental controls can be difficult because mobile devices may not be readily physically available for configuring parental controls. And, more importantly, an understanding of operational elements and access configuration elements of mobile devices and resource providers and resources may be required to implement parental controls. For example, operational elements and access configuration elements can include knowledge of how a content provider server stores resources, how a mobile device accesses the resources, and technical details of resource locations and types of resources. As such, with conventional parental control services that support parental controls on mobile devices, users (e.g., parents) are expected to have a technical knowledge to implement protection against unwanted content. In addition, parents are expected to actively update restricted content on their own without much assistance. Some systems implement global blocks that can block content that would otherwise be acceptable. As such, a comprehensive parental control service that supports implementing parental controls on mobile devices to alleviate the above-described expectations on users can optimize implementing parental controls on mobile devices Additionally, challenges in implementing parental controls can also be due to the different contexts (e.g., while in motion) and management software (e.g., messaging platform) of media platforms. Resolving such context and management software challenges can be part of a technology-based solution that also implicates the specific configuration and components that support the media platforms. By way of background, mobile devices can operate using different types of operating systems. Mobile operating systems (mobile OS) can offer varying degrees of control of the operating system for implementing applications for a mobile device running the operating system. For example, a first mobile OS can allow applications to directly communicate and control components of the first mobile OS while a second mobile OS may implement restrictions to operations that an application can execute against the second mobile OS when running the application. In this regard, trying to lock down the second mobile OS in order to implement parental control service restrictions requires accounting for the configuration and components of the second mobile OS. As such, a comprehensive parental control service technology-based solution can override the routine and conventional sequence of events ordinarily triggered by a mobile device operations and parental control service and instead implement functionality directed to improving specific configuration and components supporting operations on a mobile device.

Embodiments of the present invention provide simple and efficient methods, systems, and interfaces for implementing parental controls on devices, based on a virtual private network (VPN)-based parental control service. The device can specifically be a mobile device with outbound connectivity for both Wi-Fi and cellular data traffic that can be restricted as described herein. The VPN-based parental control service leverages a VPN in order to provide parental controls to the mobile device whose requests for resources are communicated through the VPN. It is contemplated that the VPN can be implemented as a third-party service upon which a parental control service web proxy server is implemented to restrict access to restricted resources. The VPN can facilitate implementing parental controls based on predefined parental control policies selected for corresponding mobile devices (e.g., VPN device) and implemented via the VPN. The same VPN or a second implementation of another VPN operating in parallel from the parental control service may be implemented to facilitate implementing specifically mobile-based parental controls for mobile devices. Mobile-based parental control policies specifically operate via the VPN or a second VPN when motion-related conditions associated with the mobile device are met. A motion-based parental control policy includes at least one condition and at least one resource that is restricted, using the VPN, when the at least one condition is met. The VPN extends a private network across a public network. As such, the VPN device operates as if the VPN device is connected to the private network. Parental controls can be implemented on the VPN device via the VPN. The parental control policies can be predefined in that they are associated with tiers. Tiers indicate an extent of restricted resources of a predefined parental control policy such that a user (e.g., parent) can simply select a tier for the VPN device without having to fully control the details of individual tiers. Tiers can be level-based tiers (e.g., high, medium, low) or age-range-based tiers (e.g., 6-9, 10-12, and 13-14). It is contemplated that custom restricted resources and additional controls (e.g., usage controls, and application controls) can be implemented along with the predefined parental control policy.

The motion-based parental control policy can be further explained by way of a specific example, which is not intended to be limiting. In operation, a motion-based control policy that identifies a condition and resources that are restricted when the condition is met is used to generate a device motion-based control policy for a particular mobile device ("controlled device). The conditions, restrictions and resources can be identified using a predefined motion-based control policy that is selected for the mobile device. The conditions, restrictions and resources can also be user-defined. By way of example, a device motion-based control policy can include a motion-related condition that indicates that when the controlled device is moving over 10 mph, a restricted mode is initiated that includes no texting, no video-based communications, and no email. The device motion-based control policy may further include additional attributes (e.g., exclusions, exceptions, overrides, etc.) as described herein in more detail. A parental control service interface can be used to associate a motion-based control policy with a parental control profile. And, the device motion-based control policy, based on the motion-based control policy, is generated for a controlled device associated with the parental control profile. The parental control profile comprising the device motion-based control policy is communicated to a parental control server and then to a controlled device for configuring the controlled device. The controlled device can be configured with a VPN that supports restriction resources on the controlled device based on the device motion-based control policy.

At the controlled device, upon configuration of the controlled device using the parental control profile, a sensor (e.g., global position system, accelerometer, gyroscope, etc.) communicates motion-state information of the mobile device. The controlled device (e.g., via local application or service) accesses the motion-state information. The motion-state information indicates movement detected at the controlled device and in particular a measure of a speed at which the controlled device is traveling (e.g., the mobile device in the possession of a user in vehicle that moving at 10 mph). The parental control service, using the parental control server or the local application, evaluates whether the motion-state information meets a condition in a device motion-based policy of the controlled device.

It is contemplated that the motion-state information may be received and processed, at a parental control server or the local application, to determine whether the motion-state information meets the condition. Motion-state information can be retrieved based on an algorithm. The algorithm can be defined to periodically query the mobile device for information. The algorithm can be a series of steps that are performed, some steps at predefined intervals, to retrieve information from the mobile device. The information can specifically include motion-state information of the mobile device at a given time. The predefined intervals may be based on several factors, for example, retrieving the information to optimize mobile device resources (e.g., battery life) while maintaining accuracy. Also a behavioral mapping can be defined to indicate triggers for querying the mobile device. Querying can be tied to activity (including motion activity, usage activity or specific user selections) recognized on the phone. The behavioral mapping can be defined based on learning over a period of time to more efficiently identify times to perform queries. For example, if a user typically drives home from school between 3:00 PM and 3:00 PM the service will query the mobile device every 30 seconds in that time window for more accuracy. Outside that time window, the queries may be performed over longer periodic intervals (e.g., 5 minutes). The algorithm can include accessing a sensor at the mobile device and transforming the captured data (including any historically captured information) at the mobile device into a format that can be processed as defined in embodiments herein. The algorithm may also operate based on explicit configured information from a controlling user. For example, a parent at a controlling device can set the trigger speed (e.g., 15 mph), the parent can set an override for a behavioral mapping to query more frequently, the parent can set rest time intervals for perceived stops.

The mobile device operating system can also include built-in functions that can be leveraged to retrieve information. For example, a built-in function can operate to determine a course and speed of a mobile device. The algorithm can include making a call to this built-in function and retrieving output from the built-in function. In addition, the information retrieved from the mobile device can be analyzed to determine which portions are relevant for performing additional processing and analytics. Other variations and combinations for retrieving mobile device information including motion-state information are contemplated with embodiments described herein.

In one embodiment, based on the motion-state information a trigger-on attribute of a condition of the device motion-based policy is determined to have been met. The trigger-on attribute may indicate the controlled device should be restricted when the motion-state information indicates that the controlled device is moving at or over 10 mph. The parental control service initiates a restricted mode on the controlled device. The controlled device can continue receiving motion-state information such that when it is determined that a trigger-off condition (e.g., the controlled device is moving at less than 10 mph) of the device motion-based policy has been met, the restricted mode is terminated. The restricted mode can also be terminated based on other types of conditions (e.g., a timeout condition).

While in a restricted mode, the mobile device may operate to restrict resources or functionality of the controlled device. For example, a user of the controlled device would not have access to texting, phone communications, video-communications and other resources as identified in the device motion-based control policy for a particular condition that has been met. The restricted mode may operate with both a VPN channel and a cellular channel. The cellular channel may in particular process data traffic for resources that have been excluded from processing through the VPN channel. Exclusions may be explicitly identified in the device motion-based policy or exclusions can also be identified by the parental control service. The VPN implements the exclusions such that data traffic that is excluded is process through the cellular channel and not the VPN channel. The restricted mode may also include having the controlled device operating exclusively based on the VPN channel on the controlled device and block Wi-Fi and cellular data traffic. Other variations and combinations of motion-based policies, conditions, controls and data traffic channels are contemplated with embodiments described herein.

Various terms are used throughout this description. Although more details regarding various terms are provided throughout this description, general definitions of some terms are included below to provide a clearer understanding of the ideas disclosed herein:

A resource can refer to an entity that can be identified, named, addressed, accessed, or handled from a computing device. A resource can be an addressable object, such as, documents, files, or other web resources. A resource can specifically be addressed using a uniform resource locator (URL).

A predefined control policy can refer to rules for restricting a set of resources. The set of restricted resources can be identified based on a human-assisted process that selects resources to be restricted. The predefined control policy can be associated with a tier element. A tier element can indicate an extent of restricted resources of the predefined control policy. Through the human-assisted process, the predefined control policy restricted resources are selected with reference to the particular tier element. A predefined control policy can have a tier element such that a user of the parental control service can select a predefined control policy based on the tier element of the predefined control policy. A predefined control policy can also be a motion-based parental control policy.

A motion-based parental control policy can refer to rules for restricting a set of resources. The motion-based parental control policy in particular comprises at least one condition and at least one resource that is restricted when the condition is met. The motion-based parental control policy comprises a condition associated with a motion-related event that puts the mobile device in motion. The motion-related event can specifically refer to movement of the mobile device that makes the user unable to directly focus on operating the mobile device. For example, a motion-related event can include a situation where a user of the mobile device is driving or riding in a car. A motion-related event can be detected using a sensor that generates and communicates motion-state information of the mobile device. A mobile device can include a motion sensor component. The motion sensor component can refer any system or device that detects movement of the mobile device. Motion sensors may detect one, two, and three-dimensional movement of the mobile device. Motion sensors can include accelerometers, gyroscopes, compasses, and barometers such that movement associated with the mobile device is captured as motion-state information for implementing a device motion-based policy. The motion-state information can specifically include a speed associated with the mobile device during the motion-related event. The motion-state information (e.g., a mobile device moving at or over 10 mph) can be part of a condition, which when met, triggers the initiation of a restricted mode mobile device to limit functionality of the mobile device. The restricted mode supports both a VPN channel and a cellular channel. The restricted mode can operate with only a VPN channel or operate using a VPN channel and a cellular channel, where the cellular channel is used to process data traffic of resources that are not restricted or excluded.

The restricted mode may further operate in part based on a proxy service available via the parental control server operating with the VPN. The proxy service operates as a proxy for the mobile device while the mobile device is in restricted mode. The VPN support packet inspection where packet data are inspected and compared to a known packet data structure of a messaging platform (e.g., iOS messaging platform) associated with the mobile device. The proxy service intercepts, queues, and communicates messages via the VPN during a restricted mode initiated on the mobile device when the condition is met. In particular, the restricted mode can include the proxy service circumventing a message-receipt verification retry logic for the mobile device. The mobile device can operate with the messaging platform that expects an acknowledgment to be sent to the messaging platform upon receiving the message at the mobile device. If acknowledgement of this message is not received at the messaging platform, the messaging platform will continue retrying to send the message until receipt is acknowledged. This may cause significant traffic on the VPN and corresponding overhead for processing the retry messages. As such, the proxy service can communicate a proxy message from the VPN to the messaging platform. The proxy message can be structured in a known packet structure expected at the message platform as confirmation receipt of message. The proxy message operates to acknowledge receipt of the message at the mobile device, from the messaging platform, when the message has only been actually received by the proxy service implemented using the VPN. In embodiments, the proxy service may also receive messages during the restricted mode. Messages can include actual text messages but also contemplate other types of communications to the mobile device. The proxy service can generate of a queue of the messages received. Upon termination of a restricted mode at the mobile device, the proxy service can communicate the messages in the queue to the mobile device. In this regard, the proxy service saves messages during the restricted mode so that the mobile device does not miss messages sent during the restricted mode. Other variations and combinations of proxy service operations are contemplated with embodiments described herein.

The motion-based control policy further comprises restrictions and corresponding resources that are restricted. Restrictions can be different types of parental controls (e.g., content controls, application controls, and usage controls). Restrictions as parental controls are implemented when the conditions of the device motion-based parental control policy are met based on the occurrence of a motion-related event. A motion-related event of a condition may be determined based on sensors within the mobile device or based on direct input from the user via a user interface. In this regard, motion-based parental control policies can be defined such that when a motion-related event associated with a condition is determined at the mobile device, the corresponding resources that are associated with the device motion-based parental control policy are restricted.

Motion-based parental control policies can be associated with multivariate conditions (e.g., conditions include trigger-on and trigger-off attributes), condition thresholds (e.g., a maintained or sustained time period of the motion state), exceptions (e.g., a controlled user rides the bus between 9:00 am and 9:30 am daily, the mobile device is not restricted during this known period) exclusions (e.g., navigation applications), overrides (e.g., the user of the mobile phone is a passenger) that allow for nuanced implementation of conditions associated with the motion-based parental control policies.

A parental control profile can refer to information for defining a parental control service for a user. The parental control profile can include a set of instructions for configuring a device. The set of instructions can also be used for configuring or excluding a device specifically from motion-based parental control. The parental control profile can be associated with a user that is configuring one or more controlled users and devices in the parental control service. The parental control profile can include information about the user. The parental control profile is communicated to a device such that the instructions of the parental control profile can be used to configure a virtual private network (VPN) on the device. The parental control profile can also include and or indicate a device control policy (or device motion-based control policy) which can be used to restrict access to resources for a device.

A device control policy can refer to a set of parental controls that can be associated with a device. A device control policy can include a set of restricted resources from a predefined parental control policy. The restricted resources can be identified based on a predefined control policy selected when generating the device control policy. The device control policy can further include custom restricted resources and additional controls. A device control policy can comprise a motion-based device policy which can be used to restrict access to resources based on motion-related events occurring at the mobile device.

A parental control service platform refers to integrated components of hardware architecture and/or software framework that support the VPN-based parental control service. The parental control service platform can specifically support a parental control service interface (e.g., a web portal interface or an application configuration manager interface) for configuring parental control profiles and generating device control policies for corresponding devices as described herein.

Accordingly, in a first embodiment described herein, a system for implementing parental controls on devices, using virtual private network (VPN)-based parental control services is provided. The system includes a controlling device component configured for: accessing a set of predefined parental control policies, where a predefined parental control policy comprises a plurality of restricted resources. The set of predefined parental control policies are provided in a VPN-based parental control service. The controlling device component is further configured for: receiving a selected predefined parental control policy, where the selected predefined parental control policy is associated with a parental control profile. The parental control profile includes instructions to configure a controlled device with a device control policy. The controlling device component is also configured for generating the device control policy for the device, where the device control policy comprises at least the selected predefined parental control policy, and communicating the device control policy.

The system includes a parental control server component configured for: communicating the set of predefined parental control policies to the controlling device component; receiving the device control policy for the device; restricting access to resources based on restrictions identified in the device control policy, where requests for resources are resources are received via a VPN of the parental control service platform; and communicating an indication that access to resources associated with requests is restricted.

The system also includes a controlled device component configured for: receiving the parental control profile; configuring the device for the VPN using the parental control profile; restricting requests for resources from the device to the VPN; communicating the requests for resources using the VPN; and receiving the indication that access to resources associated with requests is restricted.

In a second embodiment described herein, a computer-implemented method for implementing parental controls on devices using virtual private network (VPN)-based parental control services is provided. The method includes accessing a set of predefined parental control policies, where a predefined parental control policy comprises a plurality of restricted resources. The set of predefined parental control policies are provided in a VPN-based parental control platform. The method further includes receiving a selected predefined parental control policy, where the selected predefined parental control policy is associated with a parental control profile. The parental control profile includes instructions to configure a controlled device with a device control policy. The method also includes generating the device control policy for the device, where the device control policy comprises at least the selected predefined parental control policy. The method includes communicating the device control policy such that enforcement of restrictions is performed on resources requested from the controlled device.

In a third embodiment described herein, one or more computer storage media having computer-executable instructions embodied thereon that, when executed, by one or more processors, cause the one or more processors to perform a method for implementing parental controls on devices, using virtual private network (VPN)-based parental control services. The method includes receiving the parental control profile, where the parental control profile includes instructions to configure a controlled device with a device control policy. The method also includes configuring a VPN using the parental control profile, where the VPN comprises a virtual point-to-point connection between the controlled device and a network of a parental control service platform. The method also includes communicating requests for resources from the device using the VPN. The method further includes receiving an indication that access to resources associated with the requests for resources is restricted.

In a fourth embodiment described herein, a system for implementing motion-based parental controls on devices using virtual private network (VPN)-based parental control services is provided. The system includes a controlling device component configured for accessing a motion-based control policy to associate the motion-based control policy with a parental control profile, the motion-based control policy comprises a condition and a resource that is restricted when the condition is met; generating a device motion-based control policy for a controlled device, the device motion-based control policy comprises at least the motion-based control policy, the device is associated with the parental control profile that supports implementing the device motion-based control policy in a VPN-based parental control service; and communicating the device motion-based control policy such that enforcement of restrictions is performed on resources on the controlled device based on the device motion-based control policy.

The system further includes a parental control server component configured for communicating the motion-based control policy to the controlling device component; receiving the device motion-based control policy for the controlled device; restricting access to resources based on restrictions identified in the device motion-based control policy, requests for resources are received via the VPN-based parental control service; and communicating an indication that access to the resource associated with the condition is restricted.

The system also includes a controlled device component configured for receiving the parental control profile, the parental control profile includes instructions to configure the controlled device with the device motion-based control policy; configuring a VPN using the parental control profile, the VPN comprises a virtual point-to-point connection between the controlled device and a network of the parental control service; determining that the condition in the device motion-based control policy has been met; and restricting the controlled device based on initiating a restricted mode on the controlled device to restrict access to the resource corresponding to the condition, wherein access to the resource is restricted using the VPN In a fifth embodiment described herein, a computer-implemented method for implementing motion-based parental controls on devices, using virtual private network (VPN)-based parental control services is provided. The method includes accessing a motion-based control policy to associate the motion-based control policy with a parental control profile, the motion-based control policy comprises a condition and a resource that is restricted when the condition is met. The method also includes generating a device motion-based control policy for a controlled device, the device motion-based control policy comprises at least the motion-based control policy, the device is associated with the parental control profile that supports implementing the device motion-based control policy in a VPN-based parental control service. The method also includes communicating the device motion-based control policy such that enforcement of restrictions is performed on resources on the controlled device based on the device motion-based control policy. In a sixth embodiment described herein, one or more computer storage media having computer-executable instructions embodied thereon that, when executed, by one or more processors, causes the one or more processors to perform a method for implementing motion-based parental controls on devices, using virtual private network (VPN)-based parental control services, are provided. The method includes receiving a parental control profile, the parental control profile includes instructions to configure a controlled device for a device motion-based control policy, the device motion-based control policy comprises a condition and a resource that is restricted when the condition met. The method also includes configuring a VPN using the parental control profile, the VPN comprises a virtual point-to-point connection between the controlled device and a network of the parental control service. The method further includes determining that the condition in the device motion-based control policy has been met; and restricting the controlled device based on initiating a restricted mode on the controlled device to restrict access to the resource corresponding to the condition, wherein access to the resource is restricted using the VPN.

Figure 1B:
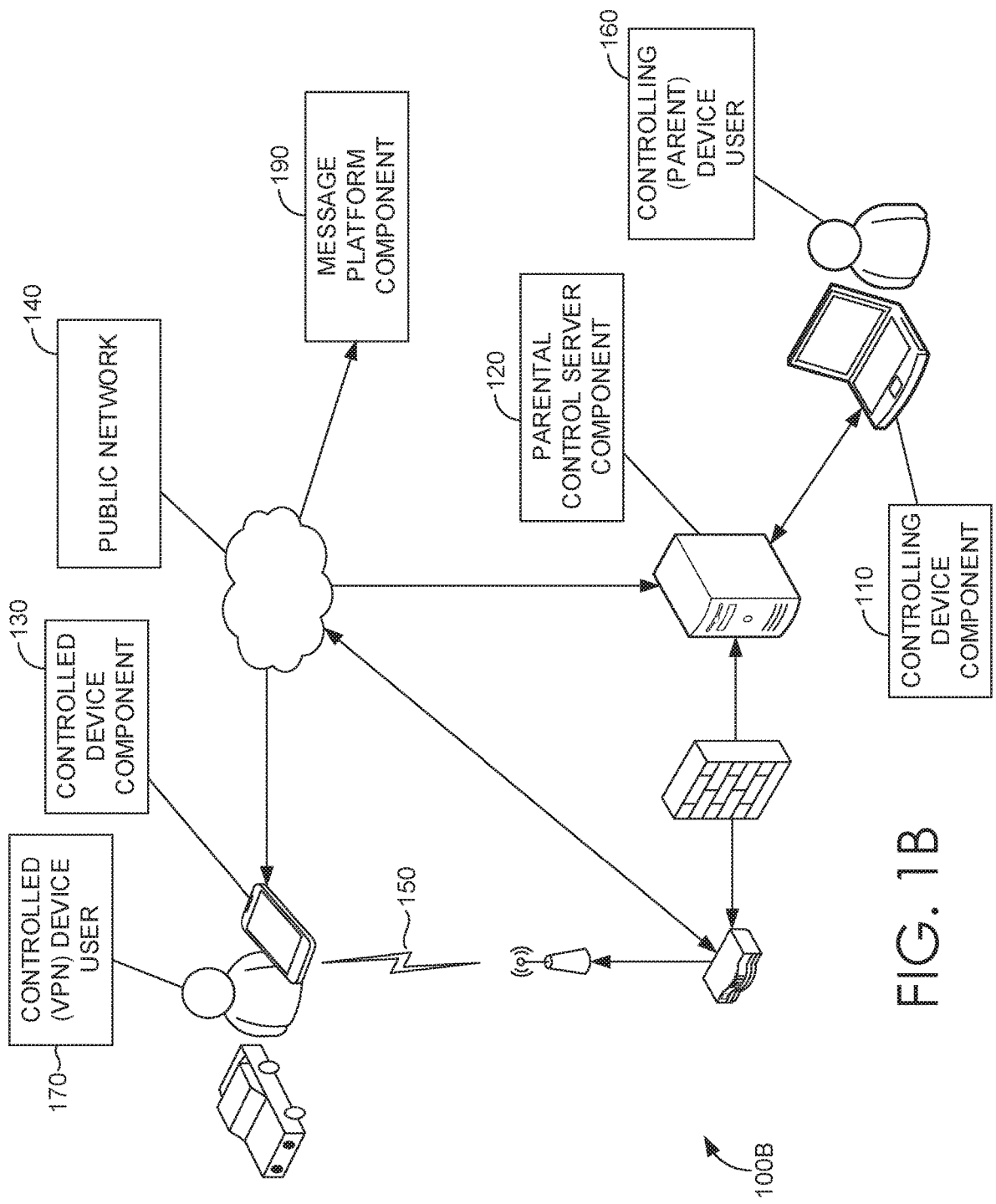

Referring now to FIGS. 1A and 1B, FIGS. 1A and 1B illustrate an exemplary parental control service platform system ("parental control system") 100 in which implementations of the present disclosure may be employed. In particular, FIG. 1A shows a high level architecture of parental control system 100 having a platform and communicating using components in accordance with implementations of the present disclosure. FIG. 1B shows a high level architecture of the parent control system 100B having additional components for supporting motion-based parental control service functionality. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, parental control system 100 includes a controlling device component 110, a parental control server component 120, a controlled device component 130, a public network 140, and a virtual private network VPN 150. Also shown are a controlling device user 160 and a controlled device user 170. The components of the parental control system 100 may communicate with each other over one or more networks (e.g., the public network 140 or the VPN 150). The public network 140 may include, without limitation, one or more local area networks (LANs) and/or wide area networks (WANs). Any number of nodes (e.g., servers) and client computing devices may be employed within the parental control system 100 within the scope of implementations of the present disclosure. The VPN 150 extends a private network across the public network 140. The private network can be the parental control service network and a public network can be the internet. The VPN 150 can facilitate a VPN device to send and receive data across public networks. The VPN can specifically support connectivity for both Wi-Fi and cellular data traffic. The VPN device operates as if it was directly connected to the private network, while utilizing components of the private network. It is contemplated that the VPN can be implemented using a VPN channel for communications using the VPN and the public network can be implemented using a cellular channel for communications using the cellular functionality and components of the public network.

FIG. 1B further includes a message platform component 190 that supports messaging for an operating system of a device. A mobile device can operate based on an operating system supports performing the operations of the mobile device. The operating system may include hardware and software components that operate exclusively with the operating system. The operating system can support messaging through a messaging platform that implements native OS messaging client for communications of the mobile device. The message platform 190 can specifically be associated with the controlled device 170 such that messages directed to the controlled device 170 are processed using the message platform. In operation, the messaging platform 190 may process message communicated to the controlled device 170. The messaging platform can also include protocols for managing communications between mobile devices. The messaging platform 190 can in particular include a message-receipt verification protocol that requires a mobile device receiving a message to acknowledge receipt of the message. The messaging platform 190 can implement a message-receipt verification retry logic that continues communicating with the mobile device in order to verify receipt of a message sent to the mobile device. The message platform 190 also can communicate using messages in a defined data packet structure (e.g., iMESSAGE packet, port, IP range etc.) and expect messages communicate back in a defined data packet structure.

In the parental control system 100, the components are provided by a parental control service platform. The parental control service platform comprises several components operating together to provide the parental control service feature as described herein. By way of example, three main components can be involved, the controlling device component 110, the parental control server component 120, and the controlled device 130. A parent can register and configure a parental control profile using a parental control service interface of the controlling device component 110. The parental control service interface can be a web-based portal interface or an application configuration manager interface. The parental control profile can be password protected. The parental control profile can be associated with one or more children with one or more corresponding controlled devices such that the devices are controlled using the parental control services.

The controlling device component 110 can further implement the parental control service interface that supports receiving and communicating a predefined parental control policy, custom resource restrictions, and additional controls for a device control policy. The predefined parental control policy can be associated with a tier element that indicates an extent of restricted resources in the predefined parental control policy. The predefined parental control policy can be defined and automatically updated with new restricted resources based on a human-assisted process. Updating the predefined parental control policy can include investigating and reviewing new resources available on the internet. It is contemplated that configuring controls can be a one-button solution via the parental control service interface. The controlling device component 110 can communicate the parental control profile and the device control policy to the parental control server component 120 to restrict the devices.

The parental control interface also supports receiving and communicating a motion-based parental control policy. A motion-based parental control policy can be associated with a parental control profile. A motion-based parental control policy can be selected or instantiated for a parental control profile based on a user associated with the parental control profile selecting or instantiating the motion-based parental policy via the parental control interface. At a high level, the motion-based parental control policy limits or restricts functionality of the mobile device when it is determined that the mobile device is in motion based on motion-state information of the mobile device.

The motion-based parental control policy can include predefined motion-based policy attributes or user-defined motion-based control policy attributes. Motion-based policy attributes can include conditions and corresponding resource restrictions (i.e., parental controls), condition thresholds, exclusions, exceptions, and overrides, as described herein in more detail. Pre-defined motion-based policy attributes include pre-selected default motion-based policy attributes for restricting the mobile device (e.g., a human-assisted process or tier system) while user-defined motion-based attributes include user selected configurations for the motion-based attributes.

A condition identifies a motion-related event at the mobile device, that when detected at the mobile device, triggers a corresponding resource restriction also identified in the condition. For example, the motion-related even can be a determination indicating that the mobile device is moving at over 10 mph or the mobile device is in the possession of a user moving at over 10 mph. A motion-related event can also be determined based on user indication that the mobile device is in motion. When this motion-related event is determined, it triggers a resource restriction (e.g., a restricted mode). Individual resources can be restricted or a restricted mode can include a combination of restricted resources. Further resources can be restricted based on parental controls as described herein (i.e., custom restricted resources and additional controls (e.g., usage controls, and application controls)).

A condition can be a multivariate condition involving multiple variables that are evaluated. The condition can include a trigger-on attribute and a trigger-off attribute that are defined such that motion-state information is continuously or periodically evaluated to determine whether either the trigger-on attribute or the trigger-off attribute is met. For example, motion-state information can indicate that the mobile device is moving at or over 10 mph and also later indicate that mobile device is moving at less than 10 mph, each corresponding to a trigger-on attribute and trigger-off attribute respectively.

A condition can also include condition threshold attribute that refer to refinements associated or added to a condition to allow for nuanced implementation of the condition. For example, a time threshold can be added to a condition, in particular, a condition that restricts the mobile device at or over 10 mph may indicate that the motion-related event has to be sustained or maintained for at least 2 minutes prior to triggering a restriction mode. This limits the condition from being met simply on a sudden burst of speed that is identified at the mobile device. Also a condition could also have a condition threshold to turn off the restriction mode after motion-state information signals that the mobile device has gone below 10 mph and this motion-related event has been sustained for a define period of time. For example, a controlled device does not turn off the restricted mode at a stop light when the user is periodically stopped. As such, condition thresholds contemplate real life situations, where the real life situations correspond to condition threshold attributes that are added to conditions. The conditions having condition threshold attributes make the conditions more effectively achieve the goals of the motion-based parental controls.

A condition may be associated with an exclusion that explicitly identifies one or more resources that are excluded from a restriction. The condition would otherwise include the resource as a restricted resource. For example, a condition could indicate that all installed applications on the mobile device are turned off in restricted mode. However the condition could further identify navigation applications (e.g., MAPQUEST and GOOGLE MAPS) as excluded from this restrictions. It is contemplated that certain exclusions may also be configured administratively by the parental control service. This way exclusions do not always have to be configured as part of a condition.

A condition can also include an exception attribute. An exception attribute identifies instances when a condition is met; however a restriction mode is not initiated. In particular, the condition exists as part of the device motion-based control policy, a determination is made that the condition has been met, but the restricted mode is not initiated. For example, a parent may know a teenager's schedule includes bus rides between 7:00 am and 7:30 am and also 3:00 pm and 3:30 pm. The parent may configure an exception attribute for the condition. The exception attribute accounts for these time periods. In this regard, during these excepted time periods, when the condition is met by the motion-related activity, the restriction mode is not initiated. Exceptions can also be contemplated for different types of instances, the above-described example is not meant to be limiting.

The parental control service can support configuring an override mechanism that supports turning off restrictions on a mobile device. The override mechanism can be associated with the parental profile and for the particular mobile device. The override mechanism can be selectively turned off or on for the mobile device. The override mechanism in some situations is used to specifically override a device motion-based control policy or a condition within the device motion-based control policy. The override mechanism can be implemented in various different ways that seek to overturn restrictions on the mobile device. In one embodiment, the override mechanism operates based on one or more override request actions and one or more override response actions.

At high level, the controlled device can send an override request for an existing or anticipated restricted mode of the mobile device. The existing restricted mode refers to when the restricted mode is already active on the mobile device. An anticipated restricted mode contemplates instances where the restricted mode has not been initiated but will be based on action to come. This way, a user of the controlled device can request for an override ahead of time. An override response to an override request can trigger terminating the restricted mode on the mobile. The actions in the override mechanism may require communication back and forth between a controlled device and a controlling device. For example, if a controlled device user is a passenger in a moving car and a condition triggers a restricted mode on the controlled device, the controlled device user may send a request to the controlling device user to override the restricted mode. The parental control service can allow communication with the controlling device to communicate this request. The VPN support communications for performing operations of the override mechanism. The controlling device user can remotely approve an override of the restricted mode. For example, sending an override command to the parental control service. It is contemplated that the controlling user may require additional information from the controlled device in order to approve an override request. As such, parental service interface can support opening up specific communication controls between the controlled device and controlling device as part of the override mechanism. For example, a controlling device user may require visual evidence that the controlled device user is indeed passenger of the vehicle. The controlling device user can then send visual evidence (e.g., a picture snapshot, upon which the controlling device user then approves the override request. It is contemplated that communication for operations in the override mechanism can include resources that are restricted in the restricted being temporarily unrestricted in order to execute the override operations. For example, a messaging application can be enabled to allow for temporary texting when requesting the override of the restricted mode. The above-described override limitation is exemplary and not meant to be limiting. Other variations and combinations of conditions, restrictions, resources, exceptions, exclusions, and overrides are contemplated with embodiments described herein.

The parental control component 120 can receive, store, and communicate the parental control profile. The parental control profile can be, in particular, used to configure the controlled device 130. The controlled device 130 can receive the parental control profile to configure a VPN on the controlled device 130. The VPN can be specifically configured for supporting a device motion-based control policy of the controlled device 130. The VPN effectively takes over the device and restricts resource requests to the VPN and communicates the resource requests through the VPN. In the embodiments, a motion-based VPN can be further configured for supporting the device motion-based control policy. The motion-based VPN may operate as a VPN channel running concurrently with a cellular channel, as discussed herein. A resource request stream from the controlled device 130 can be inspected at the parental control server component 120 to restrict access to resources that are identified in the device control policy.

Having described various aspects of the parental control system 100, it is noted that any number of components may be employed to achieve the desired functionality within the scope of the present disclosure. Although the various components of FIGS. 1A and 1B are shown with lines for the sake of clarity, in reality, delineating various components is not so clear, and metaphorically, the lines may more accurately be grey or fuzzy. Further, although some components of FIGS. 1A and 1B are depicted as single components, the depictions are exemplary in nature and in number and are not to be construed as limiting for all implementations of the present disclosure.

Figure 2A:
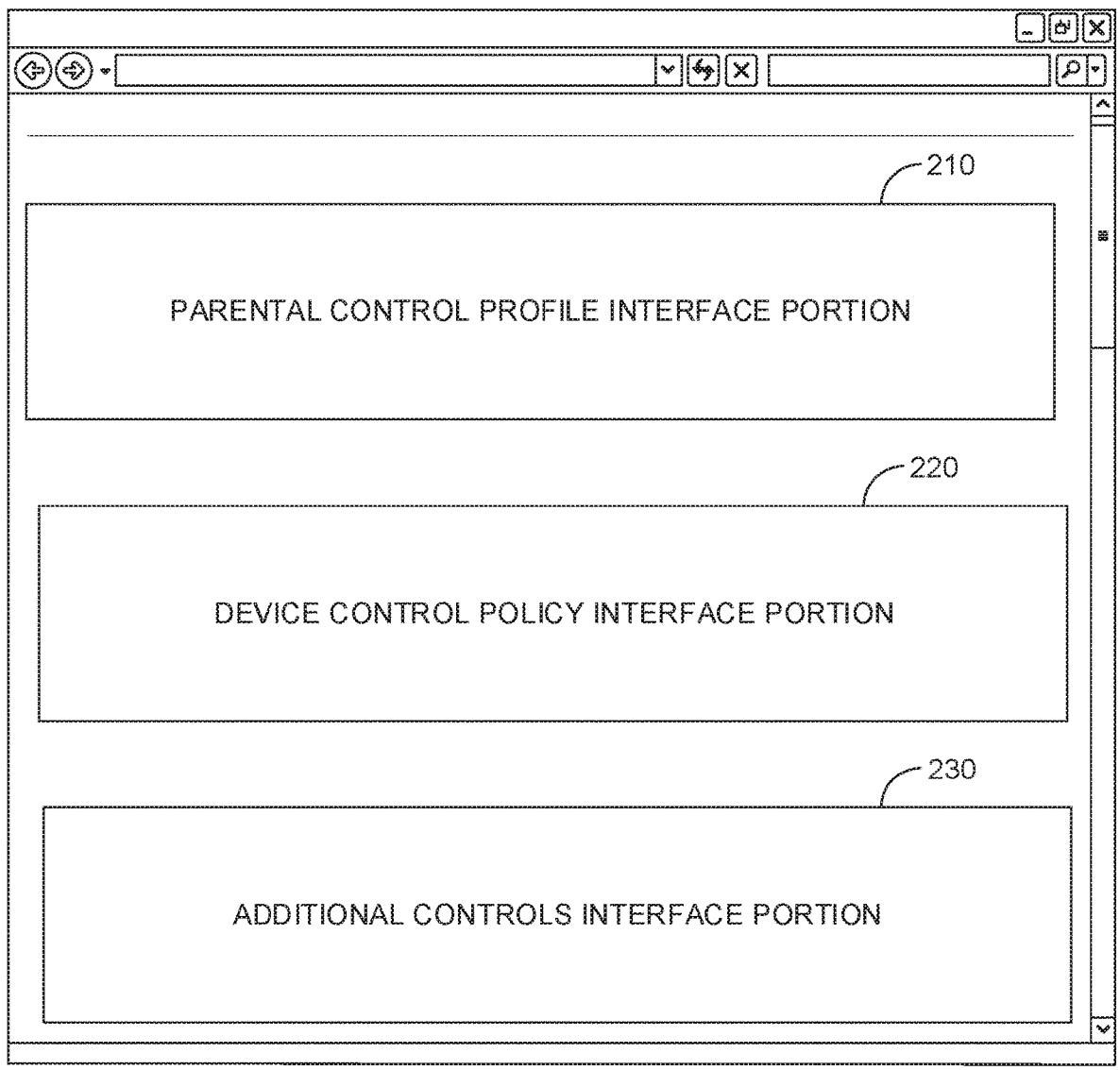
FIGS. 2A-2C are schematics of exemplary parental control interfaces of a parental control service system, in accordance with embodiments described herein.

With reference to FIGS. 1A, 1B and FIG. 2A, the controlling device component 110 can be responsible for managing a parental control interface 200A and user configurable operational elements. The controlling device component 110 can generate the parental control service interface 200A to receive configurations for operational elements. The parental profile interface can include a parental control profile interface portion 210, the device control policy interface portion 220, and an additional controls interface portion 230. The parental profile interface portion 210 can include interface elements that are generated to receive parental control profile information input. For example, the controlling device component 110 can implement an authentication mechanism. Various types of authentication mechanisms are contemplated. The authentication mechanism can be used to authenticate the user on the controlling device 110 and the controlled device 130. The authentication mechanism can be a key, generated to the bind user and the parental control profile to the controlled device. A user can also define a user name and password for the parental control profile. In addition, a user can provide personal user information for the parental control profile. Other variations and combinations of parental profile configurable operational elements are contemplated with embodiments described herein.

The parental control service interface 200A can also include the device control policy interface portion 220 for receiving input for the device control policy. A user can identify a controlled user and a device and select a predefined parental control policy for the controlled user and device. The predefined parental control policy can be associated with a tier element. The tier element indicates an extent of restricted resources of the predefined parental control policy and can include specific descriptions of the types of resources that are restricted in the predefined parental control policy. For example, a first tier can block certain web content and inappropriate advertisements and a second tier can block certain web content, inappropriate advertisements and social networks. In this regard, the first tier restricts resources at a lower extent than the second tier. The device control policy interface portion 220 can also include interface elements that allow for receiving inputs for custom restricted resources. For example, a user can specifically configure a uniform resource locator (URL) that is not specified in the predefined parental control policy as a custom restricted resource such that the URL is restricted if requested from a controlled device 130.

The parental control service interface 200A can further include the additional controls interface portion 230. The additional controls interface portion 230 facilitates defining operational elements for additional controls including usage controls and application controls. Additional controls can be associated with a device control policy for a controlled device and a controlled device user. A usage control can include time-based controls that restrict access outside of a predefined connectivity window. Basically, a controlled device is allowed access to a requested resource during a permitted connectivity time window and restricted from accessing resources outside of the connectivity time window. Application controls can turn off access to certain applications (e.g., FACEBOOK, SKYPE, or CAMERA). In this regard, the additional controls interface portion 230 provides interface elements for defining the connectivity time window for usage controls and identifying blocked applications for the application controls.

Figure 2B:
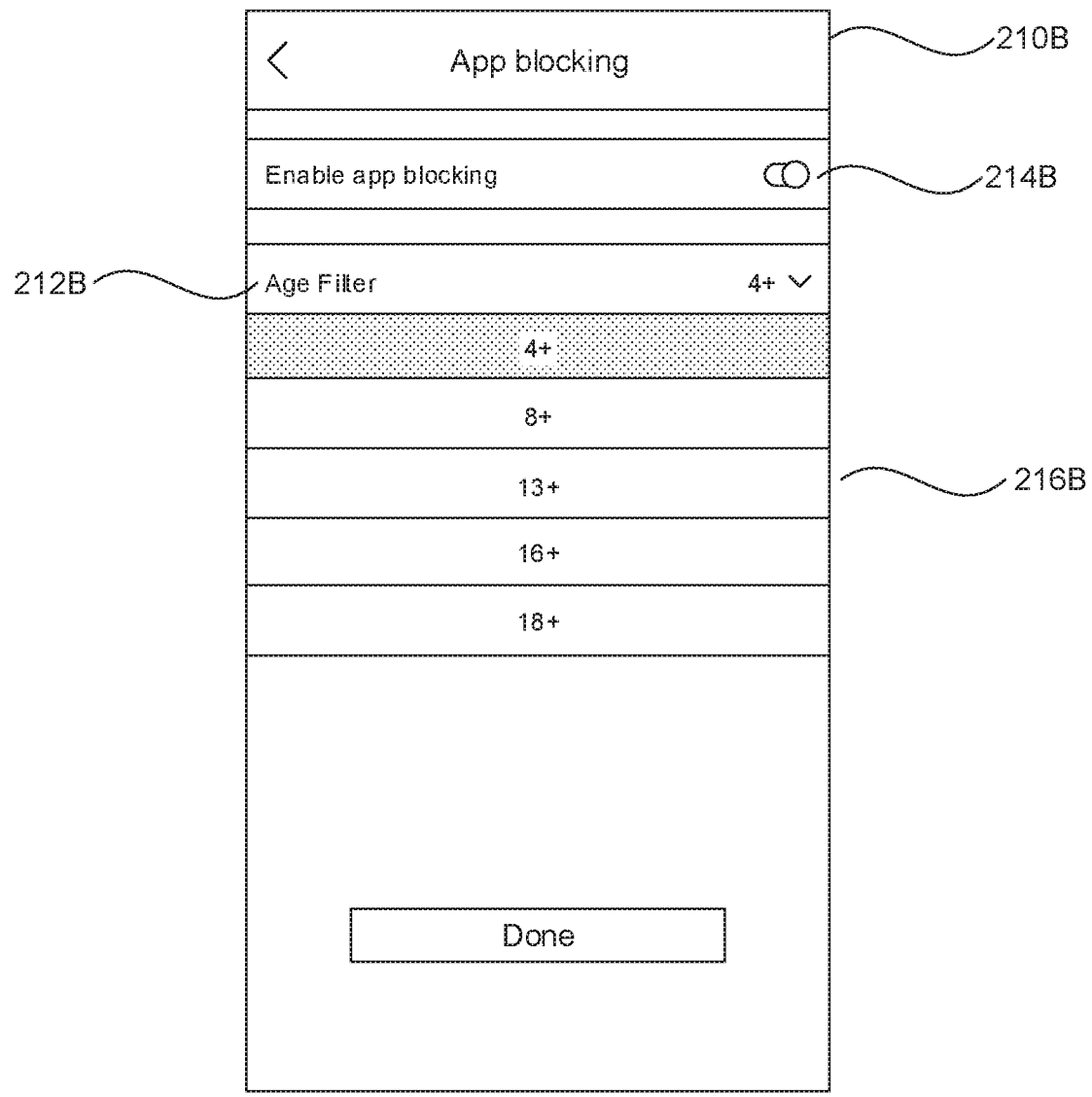
Figure 2C:
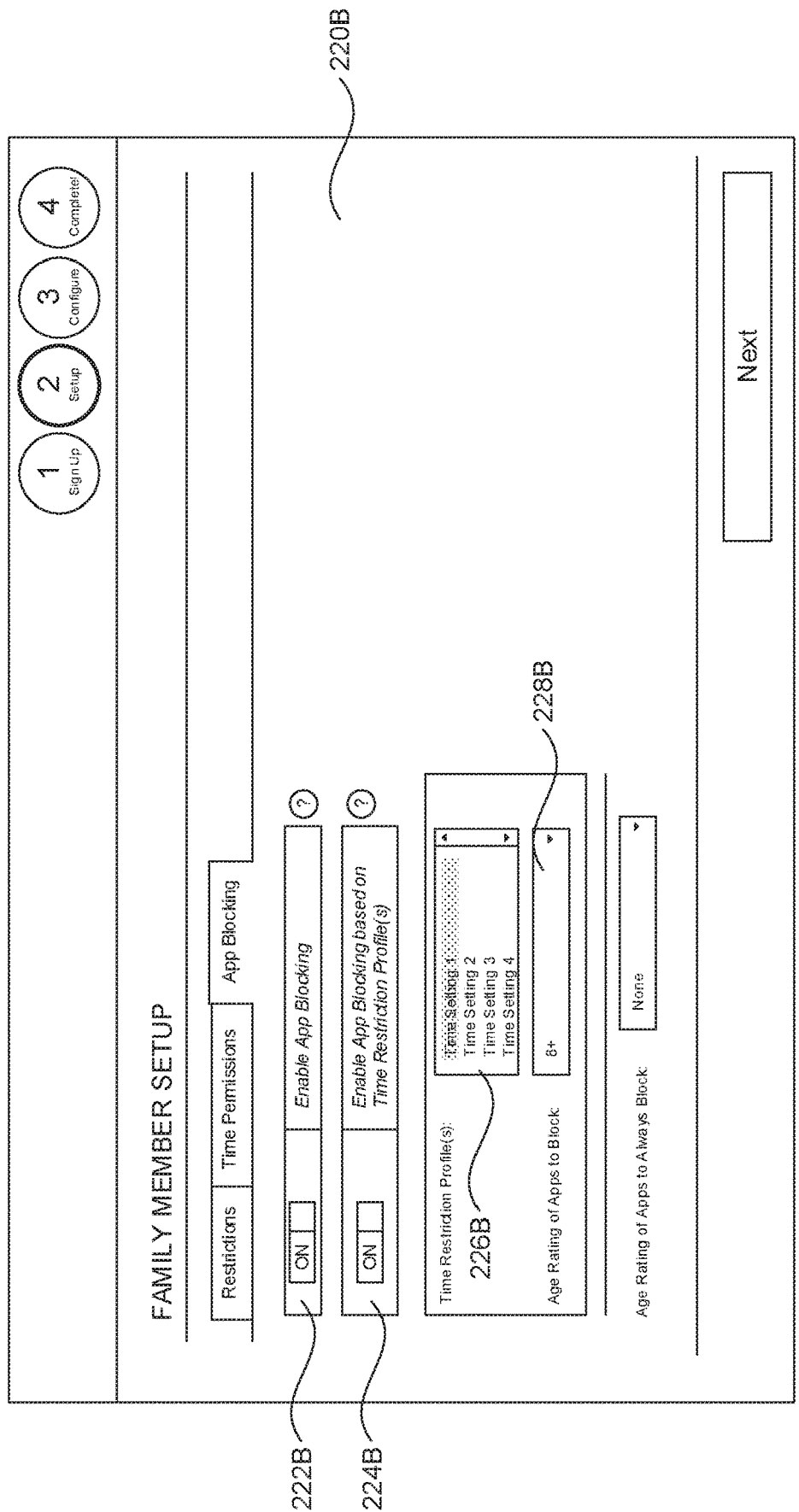

With reference to FIG. 2B, exemplary interfaces for configuring additional controls using a parental control interface are illustrated. In one embodiment, an application configuration manager interface comprises application blocking screen 210B having an age filter configuration element 212B implemented for blocking applications or specific segments of an application. The age filter can refer to an age rating associated with an application, such that applications or segments thereof are blocked based on the age rating of the application. A user can select to enable application blocking based on a toggle button 214B. The user can select one of several selectable age filters 216B to associate with the application blocking feature. As such, selecting a 4+ age filter blocks applications having an age rating of 4 and over.

With reference to FIG. 2B, a parental service interface (e.g., web-based portal) can also include a configuration screen 220B for configuring application blocking. As shown, it is contemplated that application blocking or hiding can be enabled as a global setting associated with a specific controlled user. In this regard, application blocking can be associated with controlled VPN devices of the controlled user. The global setting can be enforced continuously to hide applications of a particular rating. For example, an application having a 17+ rating can be blocked for a particular controlled user. A toggle button 222B can be selected to turn on application blocking.

A time-based application blocking or hiding can further be configured to be enforced during specific time windows. A toggle button 224B can be selected to turn on application blocking based on a time restriction profile. A time restriction profile comprising one or more time settings can also be selected for a controlled user from a plurality of time settings 226B. A time setting can include one or more time ranges (e.g., time range—9 P.M. to 5 A.M.) that when selected, applications, or segments thereof, are hidden, disabled, or otherwise restricted from a controlled user. For example, an application having a 4+ rating can be hidden from 9 P.M. to until 5 A.M. overnight. Advantageously hiding applications with a 4+ rating can address applications that do not require a network connection to operate.

It is contemplated that the time restriction profile time settings can be predefined such that a controlling user simply selects one of the available time settings. The time settings for application blocking can be, in addition or in the alternative, defined by the controlling user. The controlling user can, through the parental profile service interface, further select an age rating of applications to block. The age rating of applications to block, can be selected based on a drop down selectable input 228B. The controlling user can also select to always block applications of a particular age rating. Other variations and combination of filter options and time restriction profiles are contemplated with embodiments of the present invention. It is further contemplated the parental control service interface features described above can be leveraged for defining and generating a device motion-based parental control policy.

The controlling device component 110 can generate the device control policy. The device control policy includes the selected parental control policy and any custom restricted resources and additional controls. The controlling device component 110 can communicate the device control policy to the parental control server to carry out enforcement of the restrictions. The controlling device component 110 can also generate the parental control profile and communicate the parental control profile to the parental control service. The parental control profile can be used to configure a controlled device with a VPN of the parental control service.

The parental control server component 120 is responsible for managing parental control profiles and device control policies for implementing restricted communication of requested resources. The parental control server component 120 can include a predefined parental control policy store (not shown). The predefined parental control policy store can include a set of predefined parental control profiles. The predefined parental control policy can be communicated to the controlling device component 110 such that the parental control service interface presents the predefined parental control policy for selection.

The parental control server component 120 can receive a device control policy having at least a predefined parental control policy. The device control policy and can be associated with a parental control profile, a controlled user, and a controlled device. It is contemplated that restricted resources can be enforced using a restricted location table that can be referenced upon receiving a resource request. Restricted resources can be grouped together in a predefined parental control policy in an easy to understand tier element to quickly communicate to different types of users of the parental control service restrictions implemented on a controlled device. A tier element can indicate an extent of restricted resources for a predefined parental control policy. For example, a tier element can be levels (e.g., high, med, low) or age ranges (e.g., 6-9, 10-12, and 13-14).

The parental control server component 120 can also perform mobile device management for administering the different controlled devices for functionality described herein. Mobile device management can include controlling and protecting data and configuration settings of the mobile devices with reference to restricting resources using the VPN-based parental control service. By way of example, the parental control server component 120 can maintain a user table (e.g., a subscriber master table). The user table can include a mapping to the VPN credentials of corresponding controlled devices to keep track of VPN credentials for the controlled devices.

The parental control server component 120 can implement restrictions based on the device control policy. The parental control server component 120 can implement restrictions specifically based on device motion-based control policy. As such, the parental control server component can implement a predefined parental control policy, a motion-based control policy, a usage control, and an application control. The parental control server component can also leverage a mobile device OS mobile device management (MDM) policy. The mobile device management policy includes defined controls via the OS that can be used to enforce restrictions and rules on a mobile device. Additional restriction functionality and alternative restriction functionality may be performed using built-in policies and controls of the MDM policy, in particular, when the mobile device is locked in the VPN. In this regard, the parental control server component may enforce policies defined via the parental control service or choose to access and enforce policies defined in the mobile device MDM policy.

The parental control server component can include a firewall that controls both incoming and outgoing network traffic from the controlled device 120 based on the device control policy. The firewall establishes a barrier between a trusted, secure internal private network of the parental control service and the public network. It is further contemplated that the parental control server component can include proxy services to provide administrative control over the content that can be relayed to and from the controlled device 130. In operation, by way of example, the parental control server component 120 can implement the device control policy based on account control lists. Account control lists include a list of restrictions or permission tables for a corresponding device of the device control policy. The access control list can also be used to implement usage controls and application controls. The parental control server component 120 can generate block messages upon a resource request being blocked. The parental control server 120 can implement custom block messages for specific usage controls and application controls.

The parental control server component 120 can also include a parental control profile store to store, retrieve, and communicate parental controls profile to corresponding devices. The parental control server component 120 can communicate the parental control profiles to corresponding devices. A parental control profile can be initially communicated using a public network. The controlled device 130 can receive a URL that is communicated from the parental control server component 120, for example, using email or text message, such that selecting the email or text can trigger downloading the parental control profile and configuring the VPN.

The parental control profile can include instructions for configuring a VPN of the parental control service on the controlled device. The parental control profile can also be used to configure a motion-based VPN of the parental control service on the controlled device. Configuring the VPN can include authenticating the user configuring the VPN based on an authentication mechanism of the parental control profile. For example, the controlled device component can generate an authentication prompt (e.g., request a key or PIN entered) to complete configuration of the VPN on the controlled device. The authentication mechanism also limits the capacity to turn off the VPN on the controlled device 130 without authentication.

Upon authentication, the controlled device is bound to the user, the parental control profile and corresponding device control policy. The VPN takes over network traffic leaving the controlled device. The VPN on the controlled device restricts resource requests from the device to the VPN and communicates the resource requests using the VPN. It is contemplated that the controlled device component 130 can be implemented as an application running on the mobile device. In this regard, the VPN configuration can be performed via the application. The application can further implement additional functionality beyond the VPN configuration. For example, the application can implement an application control that hides applications on end user devices. The application can include a time-based control feature. For example, at 9 PM a Camera application can be hidden from the controlled device and at 7 AM the Camera application can be restored, repeated daily. Other variations and combination of additional functionality provided using a local application of the VPN-based parental control service are contemplated with embodiments described herein.

In addition, the VPN can be configured such that the VPN is automatically reestablished before any network traffic is communicated if the VPN was otherwise turned off. The resource requests from the controlled device can inspected at the parental control server based on the device control policy to determine whether to allow access to the resource or restrict access to the resource. When the resource request is blocked at the parental control service component 120, the controlled device component 130 can receive an indication that the resource is blocked.

FIGS. 3A-3M illustrate an application configuration manager parental control service interface. Each figure can correspond to an individual configuration screen provided via the parental control interface to configure operational elements described herein. FIG. 3A includes input fields for email 302 and password 304 such that a user can sign into 306 the application configuration manager using their email and password credentials. A register button 308 is also included to support registering new users who do not yet have credentials.

Figure 3B:
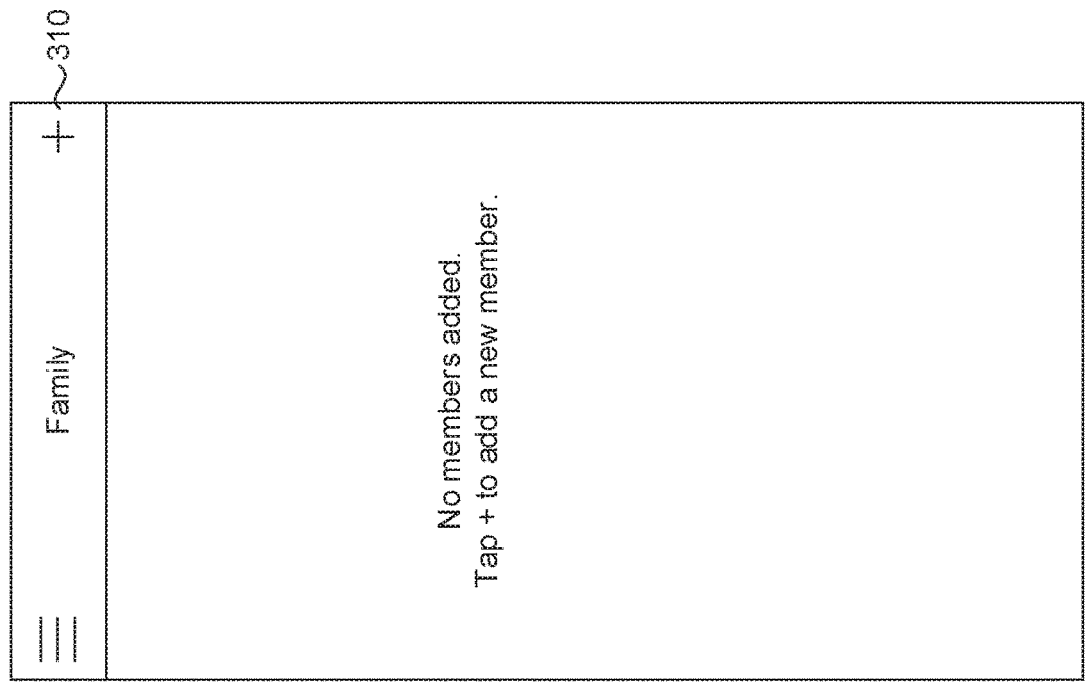
Figure 3A:
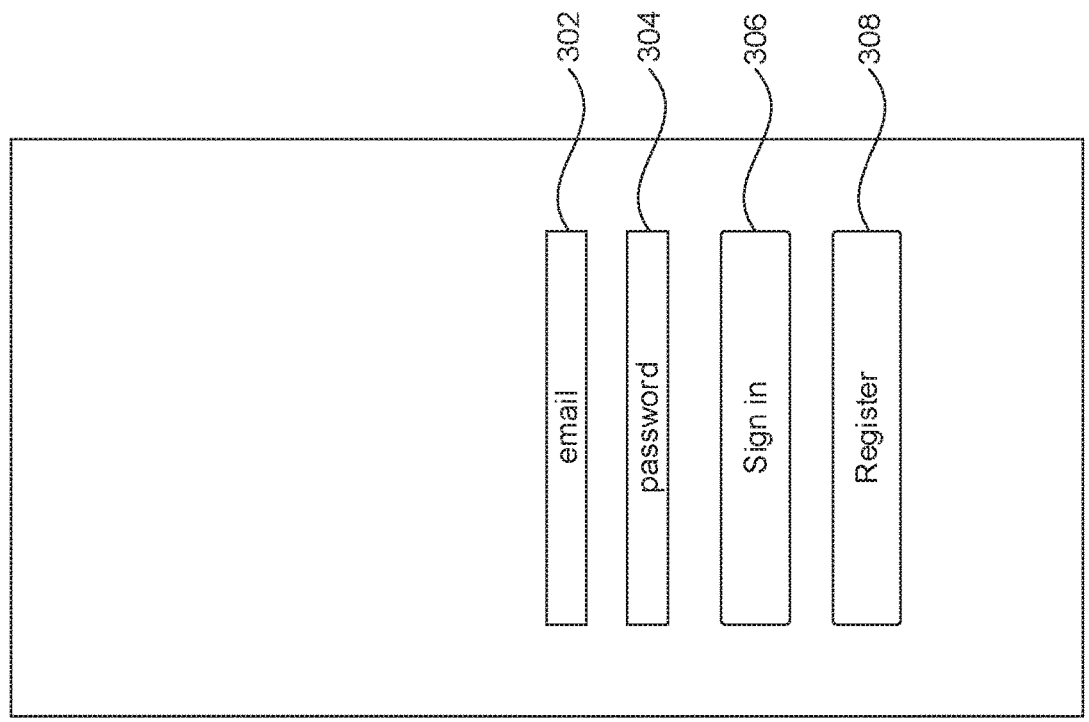
Figure 3D:
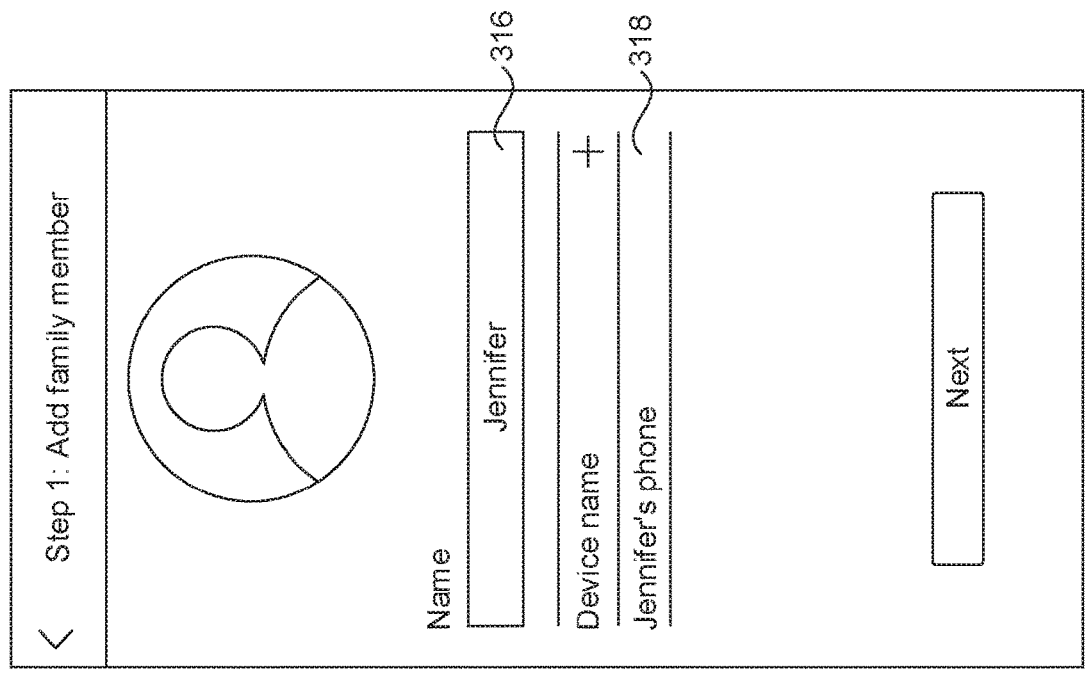
Figure 3C:
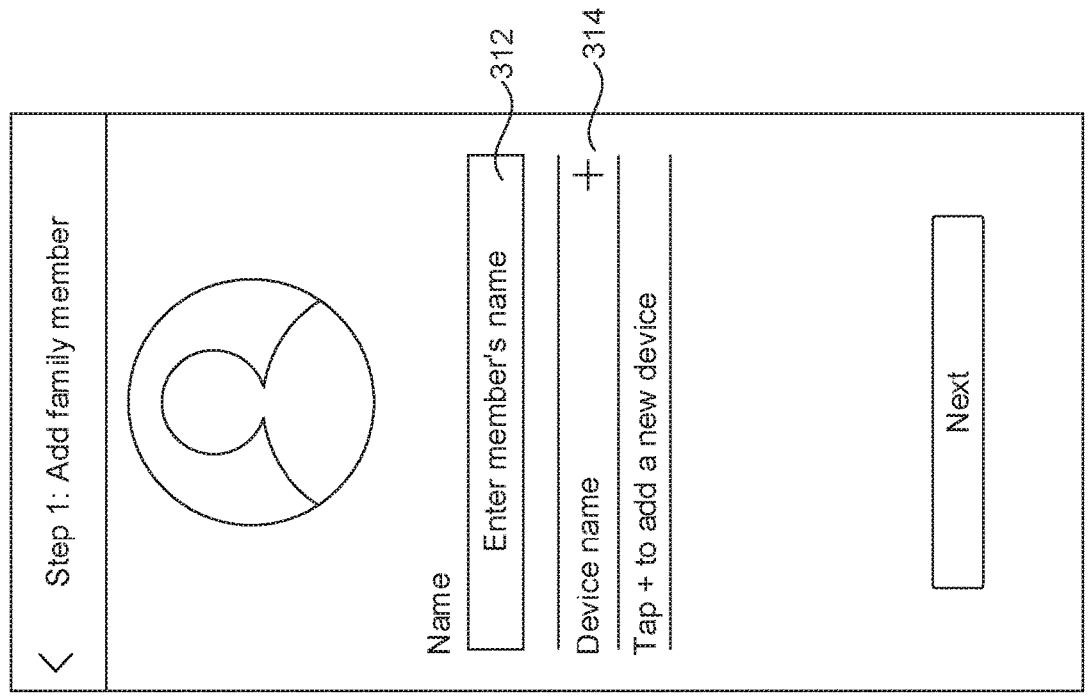

With reference to FIG. 3B, an add new member screen is illustrated. The screen provides interface features (e.g., plus button 310) for adding a new member (e.g., family member) profile to control using the parental control service. FIG. 3C provides a member's name field 312 to enter the member's name and also an add device button 314 to add one or more devices associated with that member. In FIG. 3D, a new member and device—Jennifer 316 and Jennifer's phone 318—have been entered to be controlled using the parental control service.

Figure 3E:
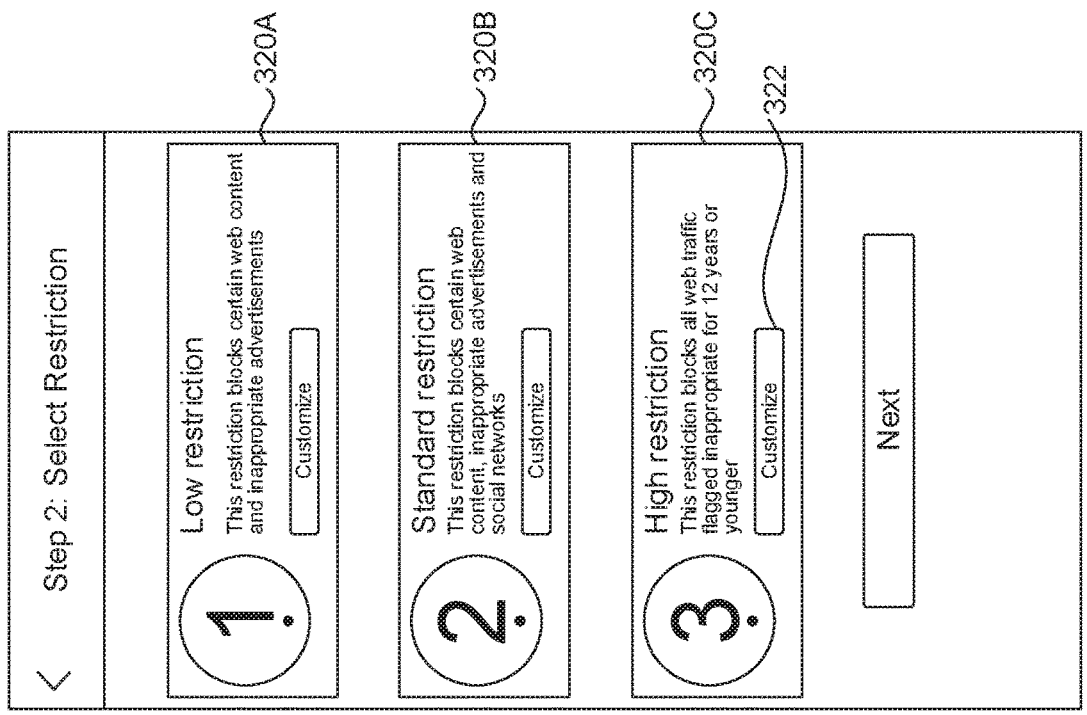

FIG. 3E illustrates three different predefined parental control policies (e.g., 1, 2, 3) 320a, 320b, and 320c. Each policy is associated with a plurality of restricted resources. Each policy can also be associated with a tier element (e.g., low restriction, standard restriction, and high restriction) that indicates an extent of restricted resources of the predefined parental control policy. Each predefined parental control policy can be further customized 322 to advantageously add and potentially remove restricted resources of the predefined parental control policy. For example, with reference to FIG. 3F, configurable elements can include toggle buttons for block advertisements 324 and enable safe search 326, and add sites to block button 328. FIG. 3G illustrates an exemplary plurality of restricted resources (e.g., blocked sites) and an add button 330 for adding a new restricted resource (e.g., URL).

FIGS. 3H and 3I illustrate a usage control 332 for defining a connectivity time window for usage controls including a toggle button to turn the usage control off 334a and on 334b. A usage control restriction can further include start and end time and a toggle to turn the usage control on or off all day. Additional configurable elements can be associated with days of the week and the weekend as shown in FIG. 3J. FIG. 3K can illustrate a configuration completion screen 336 that includes a generated URL 338 that can be accessed using the controlled device for retrieving the parental control profile at the controlled device, and configuring the VPN on the controlled device.

Figures 3L, 3M:
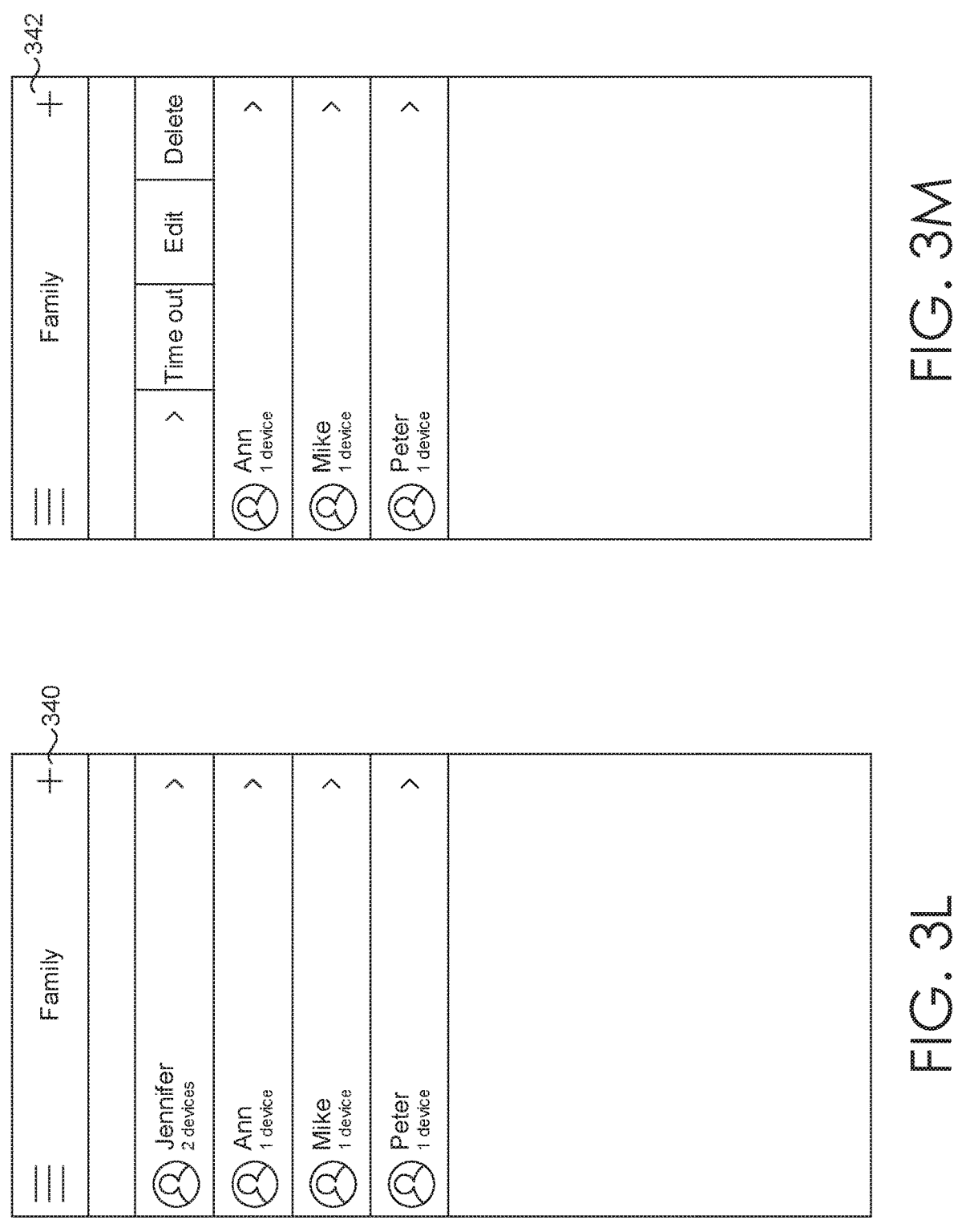

FIG. 3L illustrates an exemplary family home screen 340 that shows several controlled users in the parental control service and number of devices associated with each controlled user. It is further contemplated that individual controlled users and corresponding devices can be removed from the parental control service as shown in FIG. 3M in another exemplary family home screen 342.

Figures 4A, 4B:
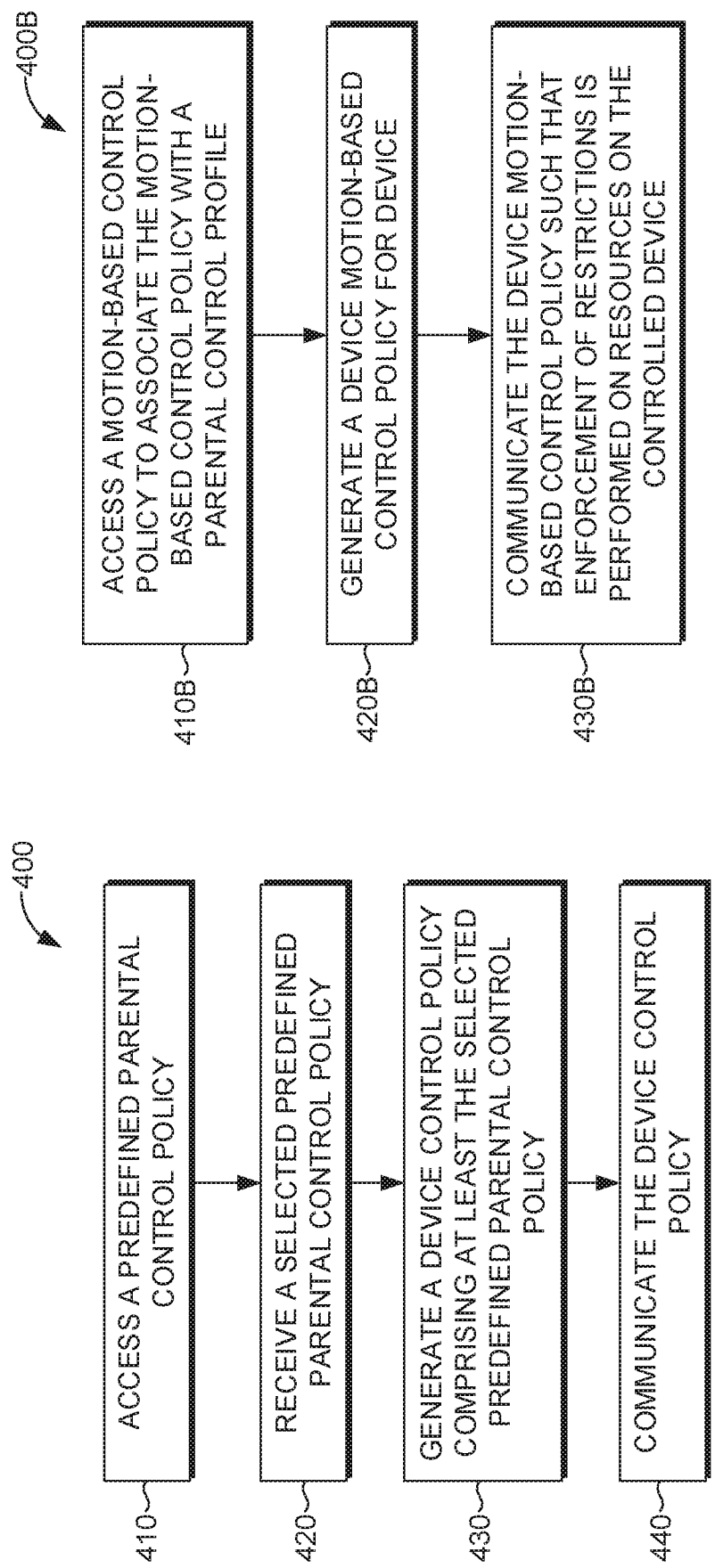
FIG. 4A is a flow diagram showing an exemplary method for implementing parental controls on devices using virtual private network (VPN)-based parental control services, in accordance with embodiments described herein.
FIG. 4B is a flow diagram showing an exemplary method for implementing motion-based parental controls on devices using virtual private network (VPN)-based parental control services, in accordance with embodiments described herein.

Turning now to FIG. 4A, a flow diagram is provided that illustrates a method 400 for implementing parental controls on devices using virtual private network (VPN)-based parental control services. Initially at block 410, a set of predefined parental control policies is accessed. A predefined parental control policy comprises a plurality of restricted resources, where the set of predefined parental control policies are provided in a VPN-based parental control platform. At block 420, a selected predefined parental control policy is received. The selected predefined parental control policy is associated with a parental control profile, where the parental control profile includes instructions to configure a controlled device with a device control policy. At block 430, the device control policy for the device is generated. The device control policy comprises at least the selected predefined parental control policy. At block 440, the device control policy is communicated such that enforcement of restrictions is performed on resource requests from the controlled device.

Turning now to FIG. 4B, a flow diagram is provided that illustrates a method 400B for implementing motion-based parental controls on devices, using virtual private network (VPN)-based parental control services. Initially at block 410B a motion-based control policy is accessed to associate the motion-based control policy with a parental control profile. The motion-based control policy comprises a condition and a resource that is restricted when the condition is met. At block 420B, a device motion-based control policy is generated for a controlled device, the device motion-based control policy comprises at least the motion-based control policy; the device is associated with the parental control profile that supports implementing the device motion-based control policy in a VPN-based parental control service. At block 430B, the device motion-based control policy is communicated such that enforcement of restrictions is performed on resources on the controlled device based on the device motion-based control policy.

Figures 5A, 5B:
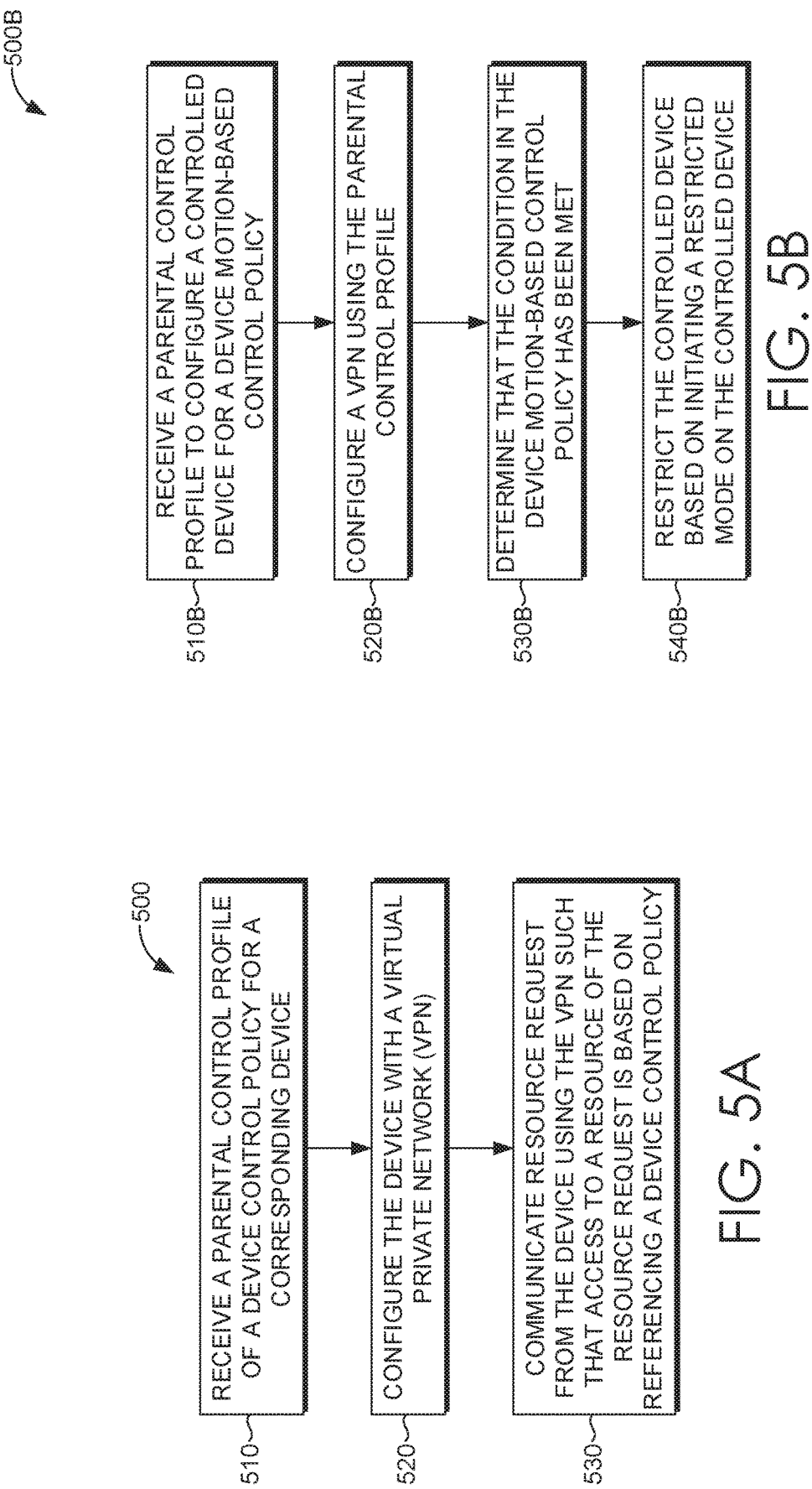
FIG. 5A is a flow diagram showing an exemplary method for implementing parental controls on devices using virtual private network (VPN)-based parental control services, in accordance with embodiments described herein.
FIG. 5B is a flow diagram showing an exemplary method for implementing motion-based parental controls on devices using virtual private network (VPN)-based parental control services, in accordance with embodiments described herein.

Turning now to FIG. 5A, a flow diagram is provided that illustrates a method 500 for implementing parental controls on devices, using virtual private network (VPN)-based parental control services. Initially at block 510 a parental control profile is received. The parental control profile includes instructions to configure a controlled device with a device control policy. At block 520, a VPN using the parental control profile is configured. The VPN comprises a virtual point-to-point connection between the controlled device and a network of the parental control service platform. At block 530, requests for resources are communicated from the device using the VPN such that access to a resource of the resource request is based on referencing a device control policy of a VPN-based parental control service.

Turning now to FIG. 5B, a flow diagram is provided that illustrates a method 500B for implementing motion-based parental controls on devices, using virtual private network (VPN)-based parental control services. Initially at block 510B a parental control profile is received. The parental control profile includes instructions to configure a controlled device for a device motion-based control policy, the device motion-based control policy comprises a condition and a resource that is restricted when the condition met. At block 520B, a VPN is configured using the parental control profile, the VPN comprises a virtual point-to-point connection between the controlled device and a network of the parental control service. At block 530B, a determination that the condition in the device motion-based control policy has been met is made. At block 540B, the controlled device is restricted based on initiating a restricted mode on the controlled device to restrict access to the resource corresponding to the condition, wherein access to the resource is restricted using the VPN.

Turning now to FIG. 6A, a flow diagram is provided that illustrates a method 600 for implementing parental controls on devices, using virtual private network (VPN)-based parental control services. Initially at block 610, a set of predefined parental control policies is communicated to the controlling device component to receive an indication of a selected parental control policy in a device control policy. At block 620, the device control policy for the device is received. At block 630, access to resources is restricted based on restrictions identified in the device control policy. The requests for resources are received via a VPN of the parental control service platform. At block 640, an indication that access to resources associated with requests is restricted, is communicated.

Turning now to FIG. 6B, a flow diagram is provided that illustrates a method 600B for implementing motion-based parental controls on devices, using virtual private network (VPN)-based parental control services. Initially at block 610B, the motion-based control policy is communicated to the controlling device component. At block 620B, the device motion-based control policy for a controlled device is received. At block 630B, access to resources is restricted based on restrictions identified in the device motion-based control policy, requests for resources are received via the VPN-based parental control service. At block 640B, an indication that access to the resource associated with the condition is restricted is communicated.

With reference to the parental control system, embodiments described herein can improve parental control services based on a parental control service platform. Parental control service platform components refer to integrated components that can generate parental control profiles and device control policies and can configure a VPN on a controlled device for restricting access to unwanted content and providing other controls. The integrated components refer to the hardware architecture and software framework that support interactive video functionality using the parental control service platform. The hardware architecture refers to physical components and interrelationships thereof and the software framework refers to software providing functionality that can be implemented with hardware operated on a device. The end-to-end software-based parental control service platform can operate within the parental control service platform components to operate computer hardware to provide parental control service platform functionality. As such, the parental control service platform components can manage resources and provide services for the parental control service functionality. Any other variations and combinations thereof are contemplated with embodiments of the present invention.

By way of example, the parental control service platform can include an API library, including specifications for routines, data structures, object classes, and variables may support the interaction between the hardware architecture of the device and the software framework of the parental control service platform system. These APIs include configuration specifications for the parental control service platform system such that the controlled device component, the parental server component and the controlled device component can communicate with each other in the parental control service platform, as described herein.

Figure 7:
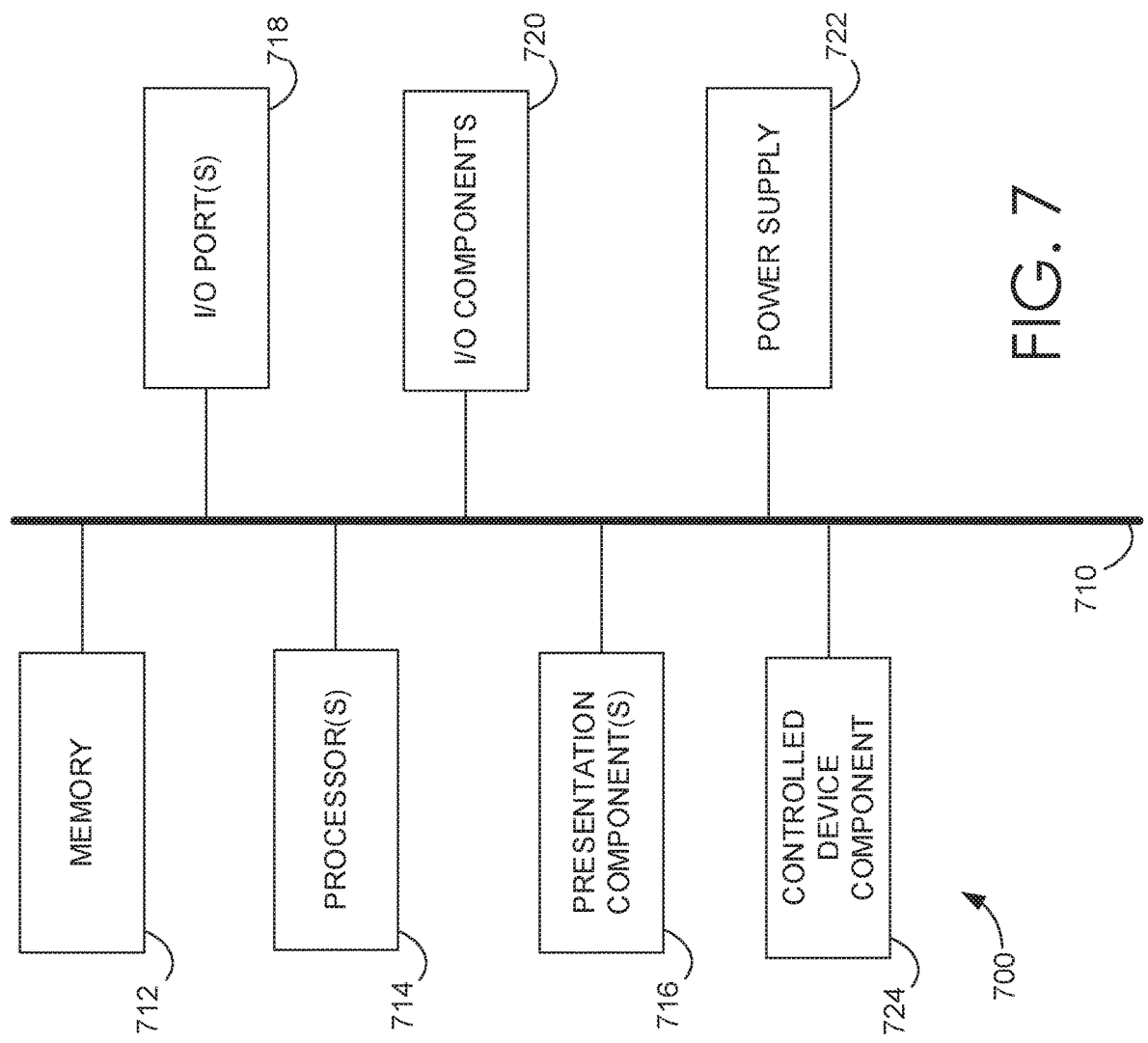
FIG. 7 is a block diagram of an exemplary computing environment suitable for use in implementing embodiments described herein.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, comprising:
  accessing a motion-based control policy to associate with a parental control profile, wherein the motion-based control policy comprises a condition and a resource that is restricted when the condition is met, wherein the motion-based control policy is accessed from a parental control server component of a parental control server;
  generating a device motion-based control policy for a controlled device, wherein the device motion-based control policy comprises at least the motion-based control policy, wherein the controlled device is associated with the parental control profile; and
  communicating the device motion-based control policy such that enforcement of one or more restrictions is performed on one or more resources on the controlled device based on the device motion-based control policy, wherein at least some of the one or more restrictions are enforced using a proxy service that operates at least in part to circumvent a message-receipt verification retry logic of a messaging platform associated with the controlled device.

2. The method of claim 1, wherein the motion-based control policy is accessed for selection using a parental control interface that supports a set of predefined motion-based control policies and one or more user-defined motion-based control policies.

3. The method of claim 1, wherein the condition is a multivariate condition having a trigger-on attribute and a trigger-off attribute that, respectively, initiate and terminate a restricted mode on the controlled device, and wherein the restricted mode restricts resources identified in the device motion-based control policy.

4. The method of claim 3, wherein the condition further includes at least one of:
  a condition threshold attribute that is a refinement to the condition to support implementation of the condition;
  an exclusion attribute that explicitly identifies one or more resources that are excluded from a restriction; and
  an exception attribute that identifies one or more instances when the condition is met but the restricted mode is not initiated.

5. The method of claim 1, wherein the parental control profile includes an override mechanism that supports an override request action and an override response action to override a restricted mode on the controlled device.

6. The method of claim 1, wherein the parental control profile includes instructions to configure the controlled device with the device motion-based control policy, wherein the parental control profile is communicated to the parental control server such that the parental control profile is communicated to the controlled device associated with the device motion-based control policy for configuring a virtual private network (VPN) on the controlled device.

7. The method of claim 1, wherein the device motion-based control policy further comprises a set of custom restricted resources, a usage control that restricts access to resources based on a defined time window, and an application control that restricts access to a selected application.

8. The method of claim 1, wherein the proxy service intercepts, inspects, queues, and communicates one or more messages via a virtual private network (VPN) during a restricted mode initiated on the controlled device.

9. One or more non-transitory computer storage media having computer-executable instructions embodied thereon that, when executed, by one or more processors, causes the one or more processors to perform a method, the method comprising:
  receiving a parental control profile, wherein the parental control profile includes instructions to configure a controlled device for a device motion-based control policy, the device motion-based control policy comprises a condition and a resource that is restricted when the condition met;
  configuring a virtual private network (VPN) using the parental control profile, wherein the VPN comprises a virtual point-to-point connection between the controlled device and a network of a VPN-based parental control service;

determining that the condition in the device motion-based control policy has been met; and restricting the controlled device based on initiating a restricted mode on the controlled device to restrict access to the resource corresponding to the condition, wherein access to the resource is restricted using a proxy service implemented using the VPN, wherein the proxy service operates via the VPN at least in part to circumvent a message-receipt verification retry logic of a messaging platform associated with the controlled device.

10. The one or more non-transitory computer storage media of claim 9, wherein determining that the condition has been met is based on:

receiving motion-state information comprising at least a measured speed of the controlled device, from a sensor associated with the controlled device; and comparing the motion-state information to one or more attributes in the condition, wherein the condition is a multivariate condition having a trigger-on attribute and a trigger-off attribute that initiate and terminate, respectively, the restricted mode on the controlled device.

11. The one or more non-transitory computer storage media of claim 9, wherein the restricted mode supports a VPN channel and a cellular channel for processing data traffic to and from the controlled device, wherein the VPN channel processes operations associated with restricted resources and the cellular channel processes operations associated with resources that are not restricted.

12. The one or more non-transitory computer storage media of claim 9, wherein the proxy service controls both incoming and outgoing resources based on the device motion-based control policy.

13. The one or more non-transitory computer storage media of claim 9, wherein the proxy service intercepts, inspects, queues, and communicates messages via the VPN.

14. The one or more non-transitory computer storage media of claim 9, the method further comprising receiving an indication that access to the resource is restricted, wherein the indication comprises custom block messages for specific content controls, usage controls, and application controls.

15. A system, comprising:
one or more processors; and
a controlling device component coupled with the one or more processors, having instructions stored thereon, which, when executed by the one or more processors, cause the controlling device component to be configured for:

receiving a parental control profile, wherein the parental control profile includes instructions to configure a controlled device for a device motion-based control policy, the device motion-based control policy comprises a condition and a resource that is restricted when the condition met;

configuring a virtual private network (VPN) using the parental control profile, wherein the VPN comprises a virtual point-to-point connection between the controlled device and a network of a VPN-based parental control service;

determining that the condition in the device motion-based control policy has been met;

restricting the controlled device based on initiating a restricted mode on the controlled device to restrict access to the resource corresponding to the condition, wherein access to the resource is restricted using a proxy service implemented using the VPN; and receiving an indication that access to the resource is restricted, wherein the indication comprises one or more custom block messages for application controls that hide one or more applications.

16. The system of claim 15, wherein the application controls comprise a first application control that hides a first application on a user device from a first time of day to a second time of day.

17. The system of claim 15, wherein the proxy service controls both incoming and outgoing resources based on the device motion-based control policy.

18. The system of claim 15, wherein the proxy service at least one of intercepts, inspects, queues, or communicates messages via the VPN.

19. The system of claim 15, wherein determining that the condition has been met is based on:

receiving motion-state information comprising at least a measured speed of the controlled device, from a sensor associated with the controlled device.

20. The system of claim 19, wherein determining that the condition has been met is based on:

comparing the motion-state information to one or more attributes in the condition, wherein the condition is a multivariate condition having a trigger-on attribute and a trigger-off attribute that initiate and terminate, respectively, the restricted mode on the controlled device.

* * * * *